(12) United States Patent
Richardson

(10) Patent No.: US 8,272,770 B2
(45) Date of Patent: Sep. 25, 2012

(54) TIR SWITCHED FLAT PANEL DISPLAY

(75) Inventor: Brian Edward Richardson, Morgan Hill, CA (US)

(73) Assignee: Rambus International Ltd., Grand Cayman (KY)

( * ) Notice: Subject to any disclaimer, the term of this patent is extended or adjusted under 35 U.S.C. 154(b) by 832 days.

(21) Appl. No.: 12/319,171

(22) Filed: Jan. 2, 2009

(65) Prior Publication Data

US 2010/0172138 A1 Jul. 8, 2010

(51) Int. Cl.
*F21V 7/04* (2006.01)
(52) U.S. Cl. ....... 362/605; 362/615; 362/616; 362/97.1; 362/277
(58) Field of Classification Search .................. 362/277, 362/296.01, 307, 607, 616
See application file for complete search history.

(56) References Cited

U.S. PATENT DOCUMENTS

| | | | |
|---|---|---|---|
| 223,898 A | 1/1880 | Edison | |
| 2,673,923 A | 3/1954 | Williams | |
| 2,971,083 A | 2/1961 | Phillips et al. | |
| 4,172,631 A | 10/1979 | Yevick | |
| 4,392,187 A | 7/1983 | Bornhorst | |
| 4,566,935 A | 1/1986 | Hornbeck | |
| 4,596,992 A | 6/1986 | Hornbeck | |
| 4,615,595 A | 10/1986 | Hornbeck | |
| 4,662,746 A | 5/1987 | Hornbeck | |
| 4,710,732 A | 12/1987 | Hornbeck | |
| 4,956,619 A | 9/1990 | Hornbeck | |
| 4,972,306 A | 11/1990 | Bornhorst | |
| 5,028,939 A | 7/1991 | Hornbeck et al. | |
| 5,083,252 A | 1/1992 | McGuire | |
| 5,126,886 A | 6/1992 | Richardson et al. | |
| 5,217,285 A | 6/1993 | Sopori | |
| 5,221,987 A | 6/1993 | Laughlin | |
| 5,319,491 A | 6/1994 | Selbrede | |
| 5,396,350 A | 3/1995 | Beeson | |
| 5,467,208 A | 11/1995 | Kokawa et al. | |
| 5,631,895 A | 5/1997 | Okada et al. | |
| 5,825,548 A | 10/1998 | Bornhorst et al. | |
| 5,936,772 A | 8/1999 | Suzuki | |
| 5,953,469 A | 9/1999 | Zhou | |
| 5,995,690 A | 11/1999 | Kotz et al. | |

(Continued)

FOREIGN PATENT DOCUMENTS

EP 814300 A1 12/1997

(Continued)

OTHER PUBLICATIONS

International Search Report and the Written Opinion with mail date of Feb. 18, 2011, re Int'l Application No. PCT/US2010/001673.

(Continued)

*Primary Examiner* — Anabel Ton
(74) *Attorney, Agent, or Firm* — Carr & Ferrell LLP

(57) ABSTRACT

A flat panel display uses pixels that are turned on or off by the enabling or disabling total internal reflection, TIR, of a light guide. A reflective surface directs the switched light towards the viewer. An optional mask can be employed to provide extremely high contrast ratios in low and in high ambient lighting conditions. The elements that enable TIR can be enabled quickly because of their small size and weight, resulting in a very fast switching speed. The fast switching speed allows colors to be generated and displayed in a sequential manner.

24 Claims, 19 Drawing Sheets

U.S. PATENT DOCUMENTS

| | | | |
|---|---|---|---|
| 6,040,937 | A | 3/2000 | Miles |
| 6,048,081 | A | 4/2000 | Richardson |
| 6,350,041 | B1 | 2/2002 | Tarsa |
| 6,360,033 | B1 | 3/2002 | Lee et al. |
| 6,421,103 | B2 | 7/2002 | Yamaguchi |
| 6,421,104 | B1 | 7/2002 | Richard |
| 6,438,283 | B1 | 8/2002 | Karaguleff et al. |
| 6,502,961 | B1 | 1/2003 | Richardson |
| 6,565,233 | B1 | 5/2003 | Richardson |
| 6,674,562 | B1 | 1/2004 | Miles |
| 6,729,734 | B2 | 5/2004 | Childers et al. |
| 6,768,572 | B2 | 7/2004 | Romanovsky |
| 6,771,325 | B1 | 8/2004 | Dewald et al. |
| 6,824,270 | B2 | 11/2004 | Kim et al. |
| 6,867,896 | B2 | 3/2005 | Miles |
| 6,924,945 | B1 | 8/2005 | Richardson |
| 6,974,232 | B1 | 12/2005 | Richardson |
| 7,080,932 | B2 | 7/2006 | Keuper |
| 7,123,216 | B1 | 10/2006 | Miles |
| 7,142,744 | B2 | 11/2006 | Walter et al. |
| 7,144,131 | B2 | 12/2006 | Rains |
| 7,177,498 | B2 | 2/2007 | Cizek |
| 7,286,296 | B2 | 10/2007 | Chaves et al. |
| 7,345,824 | B2 | 3/2008 | Lubart |
| 7,380,962 | B2 | 6/2008 | Chaves et al. |
| 7,447,397 | B1 | 11/2008 | Maki et al. |
| 7,499,206 | B1 | 3/2009 | Richardson |
| 8,025,434 | B2 * | 9/2011 | Ahlgren et al. .............. 362/613 |
| 8,152,352 | B2 * | 4/2012 | Richardson .................. 362/615 |
| 2002/0031294 | A1 | 3/2002 | Takeda et al. |
| 2002/0044720 | A1 | 4/2002 | Brophy et al. |
| 2002/0105709 | A1 | 8/2002 | Whitehead et al. |
| 2004/0076396 | A1 | 4/2004 | Suga |
| 2004/0109105 | A1 | 6/2004 | Nagakubo |
| 2005/0018147 | A1 | 1/2005 | Lee et al. |
| 2005/0057731 | A1 | 3/2005 | Lee et al. |
| 2005/0221473 | A1 | 10/2005 | Dubin et al. |
| 2005/0243570 | A1 | 11/2005 | Chaves |
| 2005/0248827 | A1 | 11/2005 | Starkweather et al. |
| 2005/0270796 | A1 | 12/2005 | Ichikawa |
| 2006/0070379 | A1 | 4/2006 | Starkweather et al. |
| 2007/0133224 | A1 | 6/2007 | Parker |
| 2007/0176887 | A1 | 8/2007 | Uehara |
| 2007/0211487 | A1 | 9/2007 | Sormani |
| 2008/0170296 | A1 | 7/2008 | Chaves et al. |
| 2008/0247169 | A1 | 10/2008 | Zou |
| 2009/0064993 | A1 | 3/2009 | Ghosh |
| 2009/0116099 | A1 | 5/2009 | Richardson |
| 2009/0262368 | A1 | 10/2009 | Leong |
| 2010/0085773 | A1 | 4/2010 | Richardson |
| 2010/0135040 | A1 * | 6/2010 | Adachi et al. ................. 362/623 |
| 2010/0172138 | A1 | 7/2010 | Richardson |
| 2010/0220492 | A1 | 9/2010 | Richardson |
| 2010/0315802 | A1 | 12/2010 | Richardson |
| 2010/0315836 | A1 | 12/2010 | Richardson |
| 2010/0328748 | A1 | 12/2010 | Richardson |

FOREIGN PATENT DOCUMENTS

| | | | |
|---|---|---|---|
| EP | 867747 | A2 | 9/1998 |
| EP | 0969305 | A1 | 1/2000 |
| EP | 0969306 | A1 | 1/2000 |
| EP | 1215526 | A1 | 6/2002 |
| EP | 1291833 | A2 | 3/2003 |
| EP | 2045633 | A1 | 4/2009 |
| GB | 663840 | A | 12/1951 |
| JP | 02002229017 | A | 8/2002 |
| WO | 2004068183 | A2 | 8/2004 |
| WO | 2008060335 | A1 | 5/2008 |
| WO | 2009024952 | A2 | 2/2009 |

OTHER PUBLICATIONS

Information Disclosure Statement with mail date of Mar. 25, 2010, re U.S. Appl. No. 12/319,171.
Information Disclosure Statement with mail date of Sep. 8, 2010, re U.S. Appl. No. 12/319,171.
International Search Report and the Written Opinion with mail date of Mar. 4, 2011, re Int'l Application No. PCT/US2010/001674.
Statement of Special Status in Support of Petition to Make Special under the Green Technology Pilot Program with mail date of Dec. 22, 2009, re U.S. Appl. No. 12/319,172.
Decision on Petition to Make Special under the Green Technology Pilot Program (Dismissed) with mail date of Feb. 22, 2010, re Application No. 12/319,172.
Information Disclosure Statement with mail date of Mar. 24, 2010, re U.S. Appl. No. 12/319,172.
Preliminary Amendment with mail date of Apr. 12, 2010, re U.S. Appl. No. 12/319,172.
Renewed Petition for Green Tech Pilot Program with mail date of Jun. 10, 2010, re U.S. Appl. No. 12/319,172.
Decision on Petition to Make Special under the Green Technology Pilot Program (Dismissed) with mail date of Jul. 13, 2010, re U.S. Appl. No. 12/319,172.
Preliminary Amendment with mail date of Aug. 13, 2010, re U.S. Appl. No. 12/319,172.
Renewed Petition for Green Tech Pilot Program with mail date of Aug. 13, 2010, re U.S. Appl. No. 12/319,172.
Decision on Petition to Make Special under the Green Technology Program (Denied) with mail date of Aug. 27, 2010, re U.S. Appl. No. 12/319,172.
Renewed Petition for Green Technology Pilot Program with mail date of Sep. 7, 2010, re U.S. Appl. No. 12/319,172.
Preliminary Amendment with mail date of Sep. 7, 2010, re U.S. Appl. No. 12/319,172.
Information Disclosure Statement with mail date of Sep. 8, 2010, re U.S. Appl. No. 12/319,172.
Decision on Petition to Make Special under the Green Technology Program (Denied) with mail date of Oct. 14, 2010, re U.S. Appl. No. 12/319,172.
Non-Final Office Action with mail date of Oct. 21, 2010, re U.S. Appl. No. 12/319,172.
Statement of Special Status in Support of Petition to Make Special under the Green Technology Pilot Program with mail date of Oct. 22, 2010, re U.S. Appl. No. 12/319,172.
Response to Office Action of Oct. 21, 2010 with mail date of Mar. 21, 2011, re U.S. Appl. No. 12/319,172.
International Search Report and the Written Opinion with mail date of Feb. 7, 2011, re Int'l Application No. PCT/US2010/001661.
International Search Report and the Written Opinion with mail date of Sep. 13, 2010, re Int'l. Application No. PCT/US2009/006763.

* cited by examiner

TIR SWITCHED FLAT PANEL DISPLAY

Applicant incorporates by reference herein his co-pending application "Optic System for Light Guide with Controlled Output", filed concurrently with this application.

FIELD OF THE INVENTION

This invention relates generally to light display devices, and more particularly is a flat panel display in which the light is switched by enabling and disabling total internal reflection (TIR), and in which the switched light is directed by optics.

BACKGROUND OF THE INVENTION

Many products require flat panel displays to display video, computer or other data. Liquid crystal displays, LCDs, have become the dominant technology utilized in flat panel displays. Another, less common technology used for flat panel displays is plasma technology. Other known display technologies used in thicker flat panel displays are of the rear projection type. For very large displays, discrete arrays of LEDs are the dominant technology. These display technologies are used in many types of products including; cellular phones, laptop computers, computer monitors, TVs, large commercial displays, and billboards. CRT type displays, that used to be the dominant technology, have almost vanished even though the performance of the newer technologies is not significantly greater than CRT. Some current art LCD displays still cannot match the refresh rate of CRTs.

Displays based on LCD technology have been evolving for decades. Thousands of patents have been filed on improvements to the basic technology. Still, the performance of these displays lacks in many ways.

A first shortcoming of LCD display technology is the high energy consumption. A 65" diagonal HDTV LCD TV typically draws around a half of a kilowatt. This is a result of the poor efficiency of the technology. LCDs need polarized light to function. However, approximately half of the light generated by the backlight is absorbed in the creation of polarized light. Many inventions have been devised to reduce this loss. In reality, little real improvement has been realized by manufactures due to cost or the reduction in other performance parameters. One product that is designed to recycle light not having the correct polarization is called "DBEF" and is manufactured by 3M of Minneapolis, Minn.

Another factor that contributes to the low efficiency of LCD displays is the fact that pixels that are turned off absorb light rather than reflect it to another pixel that is on.

Another shortcoming of LCD displays is their limitations when used with color filters. Typically red, green, and blue filters are used to create colors. These filters do not reflect unused light, but rather absorb it. For example: red filters absorb the green and blue light while only letting red light pass through. In theory, a perfect blue filter would let 33% of the light through. In reality filter materials perform significantly less than the theoretical 33%. Another place where light is absorbed is in the matrix between the color filters. This matrix area is required for circuitry and transistors used to control the pixels. The required area is significant in that one pixel requires three transistors, one transistor being required for each of the three colors. Also, additional circuitry is required to drive the transistors. The matrix area between the filters may absorb approximately half the overall light available. When all of these and other losses such as reflection and material absorption are taken into consideration, an LCD panel may only be 8% efficient when all of the pixels are on. Typically an image has approximately one half of the pixels turned on when creating an image, and with the half of the pixels are off absorbing rather than reflecting, the resulting LCD efficiency is only in the 4% range.

This poor efficiency requires the backlights used with LCD displays to be large and powerful. The dominant lamp technology used in displays is fluorescent type lamps. These lamps are reasonably efficient but require mercury. The mercury creates a disposal problem. In many cases, the mercury ends up in our food chain.

Another deficiency with LCD technology is the refresh rate. Only in the very recent past have LCDs been able to equal the refresh rate of CRT displays. For demanding applications such as the viewing of moving videos, the slow refresh rate of LCDs is apparent. Other problems with LCDs are poor contrast ratios. The contrast problem is exacerbated when viewed from a position off normal to the display surface.

The quality of the colors from a LCD display are limited by the wavelengths of light emitted from the light source and the properties of the color filters used in the display. Both of these factors result in displays that cannot accurately reproduce colors found in nature.

Another deficiency with LCD technology is their limited environmental operating range. The liquid crystal material doesn't function well at high and low temperatures. Displays that are used in extreme environments are often cooled or heated to keep them within a moderate operating range. Another problem with using LCDs in non-optimal environment is that the polarizing films required for LCD displays degrade when exposed to high humidity. Measures must be taken to reduce the effect of this property. In displays that are used in extreme environments the displays and their polarizing films are encased in glass windows.

Plasma thin panel displays are the typical technology of choice for large screen TVs. The plasma displays also consume a significant amount of power. Plasma TVs do not last as long as LCD TVs and experience "burn in". Burn in occurs when the on pixels remain on for a long period of time. These pixels lose their strength and become washed out over time. Cost is another issue with plasma technology.

In TV applications the projector is often deployed in a rear projection configuration. For computer monitors using projection display, the front projection mode is more commonly used.

Most rear and front projection displays utilize a MEMS mirror array. A MEMS mirror array in disclosed in each of U.S. Pat. Nos. 4,566,935; 4,596,992; 4,615,595; 4,662,746; 4,710,732; 4,956,619; and 5,028,939; all by inventor Larry Hornbeck of Texas, and assigned to Texas Instruments (TI) of Texas. The TI technology uses an array of MEMS mirrors that change their incidence angle to the light path to switch the light from an off position to an on position. When the mirror is in the on position, the mirror reflects the light through the optical path. When the mirror is in the off position, the light is reflected to a path that falls outside the projection optics. This in effect turns the light valve to an off state.

There are many deficiencies with this technology. One is that the light transmission is less than 70%. To allow for the change of angular orientation of the mirrors, there must be a substantial space between adjacent mirrors. The required gap causes a lot of light to be wasted. Further, the reflected light is absorbed into the light valve. The absorbed energy makes cooling the switching devices that use this technology a challenge.

Another flat panel display technology is disclosed in U.S. Pat. No. 5,319,491 by inventor Martin Selbrede of Thousand Oaks, Calif. This patent discloses a method in which the shape of an elastic membrane is changed to allow light to escape from a light guide. It is difficult to control the shape of the elastomer and therefore difficult to control the light output from the pixel. Light output from the pixels is dependent on the angle at which the light strikes the membrane. Also the angle at which the light exits the panel is off from normal. Typically light normal to the screen is the orientation in which you want the most output. Contrast ratio is limited with the elastic membrane technology. This limitation is due to the fact that any flaw in the light or optics lets light escape. An extremely small defect can produce enough light leakage to result in poor contrast when the display is primarily black. In high ambient lighting conditions the contrast is reduced by another factor. This factor is that the deformed elastomer will reflect, in some instances, the ambient light to the viewer.

Another flat panel display technology is disclosed in U.S. Pat. Nos. 6,040,937; 6,674,562; 6,867,896; and others all by inventor Mark Miles of Boston, Mass. These inventions control the distance between optical elements to control the interference characteristics of the pixel. This technology is only effective in a reflective mode and is therefore not applicable to most display applications. Three optical switches are required to create red, green, and blue colors. Not only are three-color optical switches required, but also the electronics to drive the switches must also be included.

Another display invention was recently disclosed in U.S. Publications 20050248827; and 20060070379, both by inventor Gary Starkweather of WA and assigned to Microsoft, also of WA. This technology is similar to the Hornbrook technology in that it switches light by bending or moving mirrors. This technology suffers due to its high complexity and therefore high cost. The advantage of this technology is that its theoretical efficiency is better than most other technologies. But in practice, the technology requires a collimated back light source. Sources of this type are inefficient and costly. The cost of a display with this technology will be high and the efficiency still poor. Further, the creation of a collimated backlight source requires that there be considerable depth to the display. This depth is not desirable to consumers and therefore reduces the market for this technology.

The current invention utilizes micro-optical components. Some of the prior art related to this field should also be discussed. U.S. Pat. No. 6,421,103, by Akira Yamaguchi of Japan and assigned to Fuji Film, discloses a backlight for use with LCD panels. This patent discloses light sources, a substrate, apertures (not used as a light guide), and reflective regions on the substrate. The light is either reflected by the reflective surface or passes through the apertures. The light that passes through the apertures is captured by a lens and is used to control the direction of the light. The Yamaguchi reference teaches a restricted angle of the light to concentrate more light directly at the viewer of an LCD type display.

U.S. Pat. No. 5,396,350, by Karl Beeson of Princeton, N.J., discloses a light guide with optical elements that are used to extract light from the light guide. The optical elements are on the viewer's side of the panel and have limited ability to control the direction of the light. This invention is intended to be used in conjunction with an LCD type panel to concentrate light towards the viewer.

Accordingly, it is an object of the present invention to provide a flat panel display with greatly improved light transmission efficiency with less power usage.

It is another object of the present invention to provide a less complex flat panel display, thereby reducing the cost to manufacture the display.

It is a further object to provide a flat panel display that will function over a wide temperature range.

It is a further object of the invention to provide a light valve that can switch faster by using only a small movement in the optical elements during the switching.

It is yet another object of the present invention to provide a flat panel display with a higher contrast ratio than current art displays.

It is a further object of the invention to provide a flat panel display with improved color replication.

SUMMARY OF THE INVENTION

The present invention is a light valve for use in thin flat panel displays. Flat panel displays are used in cellular phones, laptop computers, computer monitors, TVs, and commercial displays. The light valve of the present invention either extracts light or allows light to travel up a light guide through the TIR process.

Light is initially injected into the light guide from the edges of the light guide. Light then travels up the light guide by reflecting off of the inside surfaces of the light guide. If the light reaches the top of the light guide, reflective material reflects the light back toward the bottom of the light guide.

As light travels up and down the light guide, the light will typically find a point where an element of the TIR switch is in an on position, in contact with the light guide. When a switch element contacts the light guide, light is extracted from the light guide and is directed to an optic system that redirects the light to the viewer. Switch elements that are not in contact with the surface of the light guide do not extract light. Contacting switches create an "on" pixel, while a switch not in contact with the light guide will create an "off" pixel.

Additional optics and masks can be added to a given system to improve contrast ratios, viewing angle, and other parameters that are important to the display viewer. By switching the pixels in sequence with alternating colors of light, a full color display can be created with a minimal number of switches. When a full gamut of colors is fed into the light guide, sequenced switching allows the colors to be presented to the viewer without filtering.

An advantage of the present invention is that it enables a flat panel display with far greater resolution than current art devices.

Another advantage of the present invention is that the technology is easily manufactured in a flat panel display.

A still further advantage of the present invention is that the device switches much faster than the prior art as it requires a very small movement of the optics to accomplish the switching.

Yet another advantage of the present invention is that it provides better color replication with a higher contrast ratio.

Still another advantage of the present invention is that the display functions well in non-ideal environments.

These and other objectives and advantages of the present invention will become apparent to those skilled in the art in view of the description of the best presently known mode of carrying out the invention as described herein and as illustrated in the drawings.

DETAILED DESCRIPTION OF THE INVENTION

Figure 1:
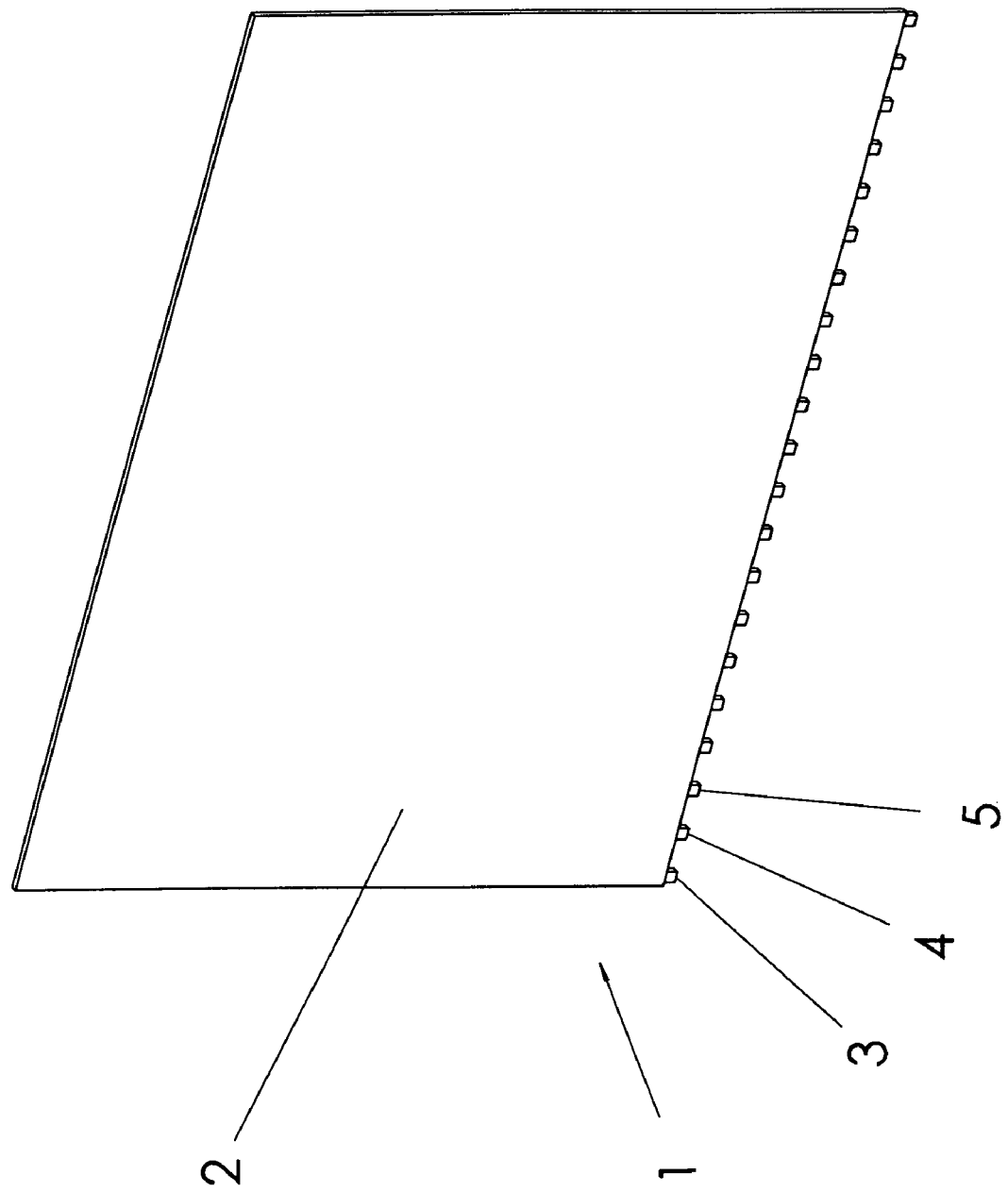
FIG. 1 shows a perspective view of the thin flat panel display with TIR switching technology.

Referring first to FIG. 1, the TIR switched thin flat panel display 1 of the present invention comprises a panel area 2. The panel area 2 has green LEDs 3, blue LEDs 4, and red LEDs 5 located along a lower edge. The number of LEDs 3, 4, 5 and the side where they are located is a function of the size, shape, and application of the desired display. The LEDs 3, 4, 5 could be located on more than one edge should a specific application require it. The LEDs 3, 4, 5 require driver electronics to drive them at the proper level and at the proper timing. A person skilled in the art of LED driver electronics could devise many different circuits to accomplish this task. In the embodiment illustrated in FIG. 1, 27 LEDs 3, 4, 5 are shown generally equally spaced along the bottom edge. With the high efficiency inherent in the TIR technology, a display with this large number of LEDs would be intended for outdoor use, with high ambient light. A display intended for a use in low ambient light would require fewer LEDs 3, 4, 5.

Figure 2:
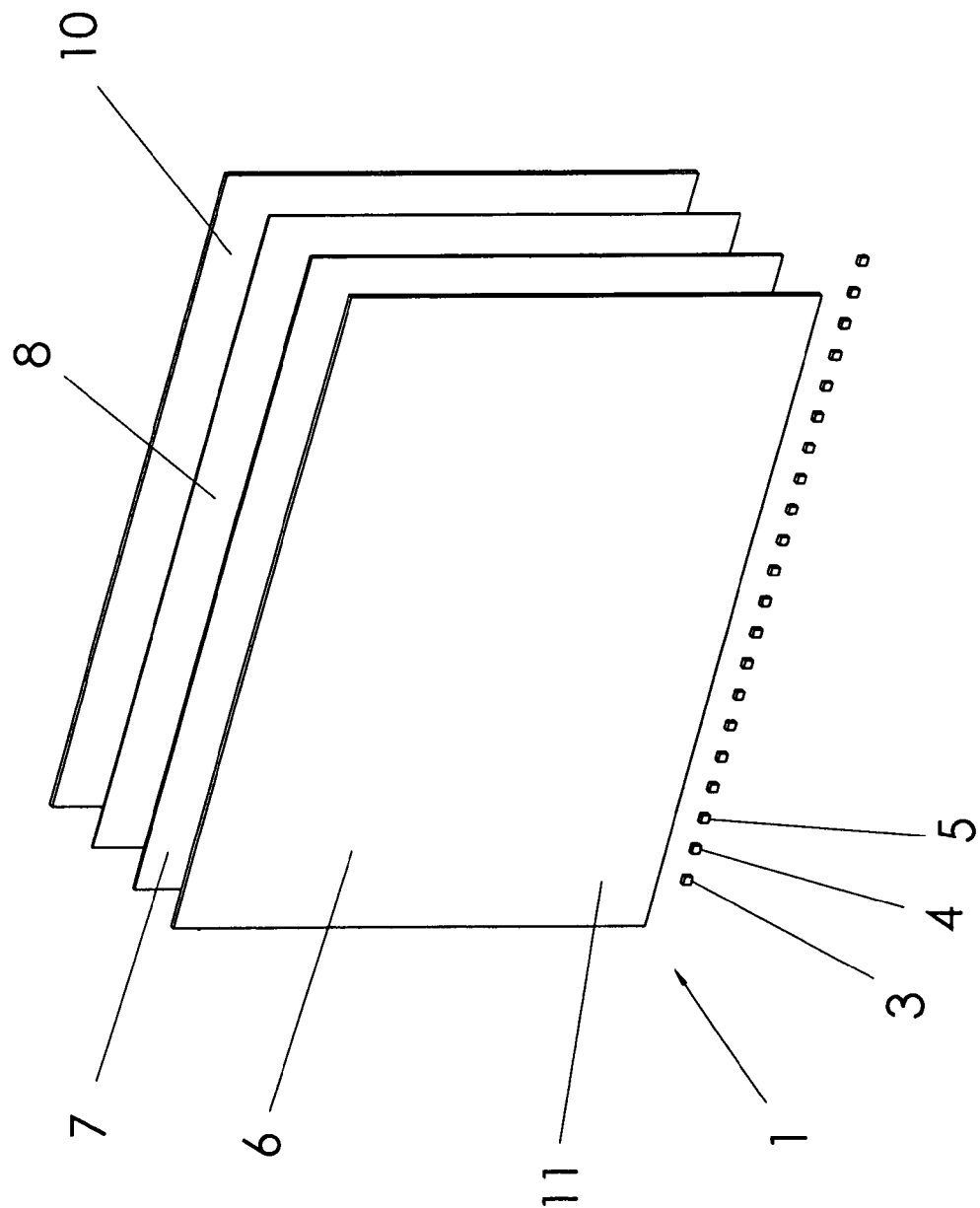
FIG. 2 is an exploded view of the display shown in FIG. 1.

FIG. 2 is an exploded view of the panel area 2, which comprises four major components. A mask and diffusion assembly 6 forms a front layer of the panel area 2. Behind the mask and diffusion assembly 6 is a light guide 7. Behind the light guide 7 is a TIR switch film 8. An electronics back plane 10 is situated behind the TIR switch film 8. All four of the major components 6, 7, 8, 10 have the same area as a pixel area 11. The number of pixels required is dependent on the display resolution.

The four major components 6, 7, 8, 10, shown exploded in FIG. 2, would in use be mated to one another as shown in FIG. 1. A cross section of a small corner of the mated assembly is shown enlarged in FIG. 3.

Figure 3:
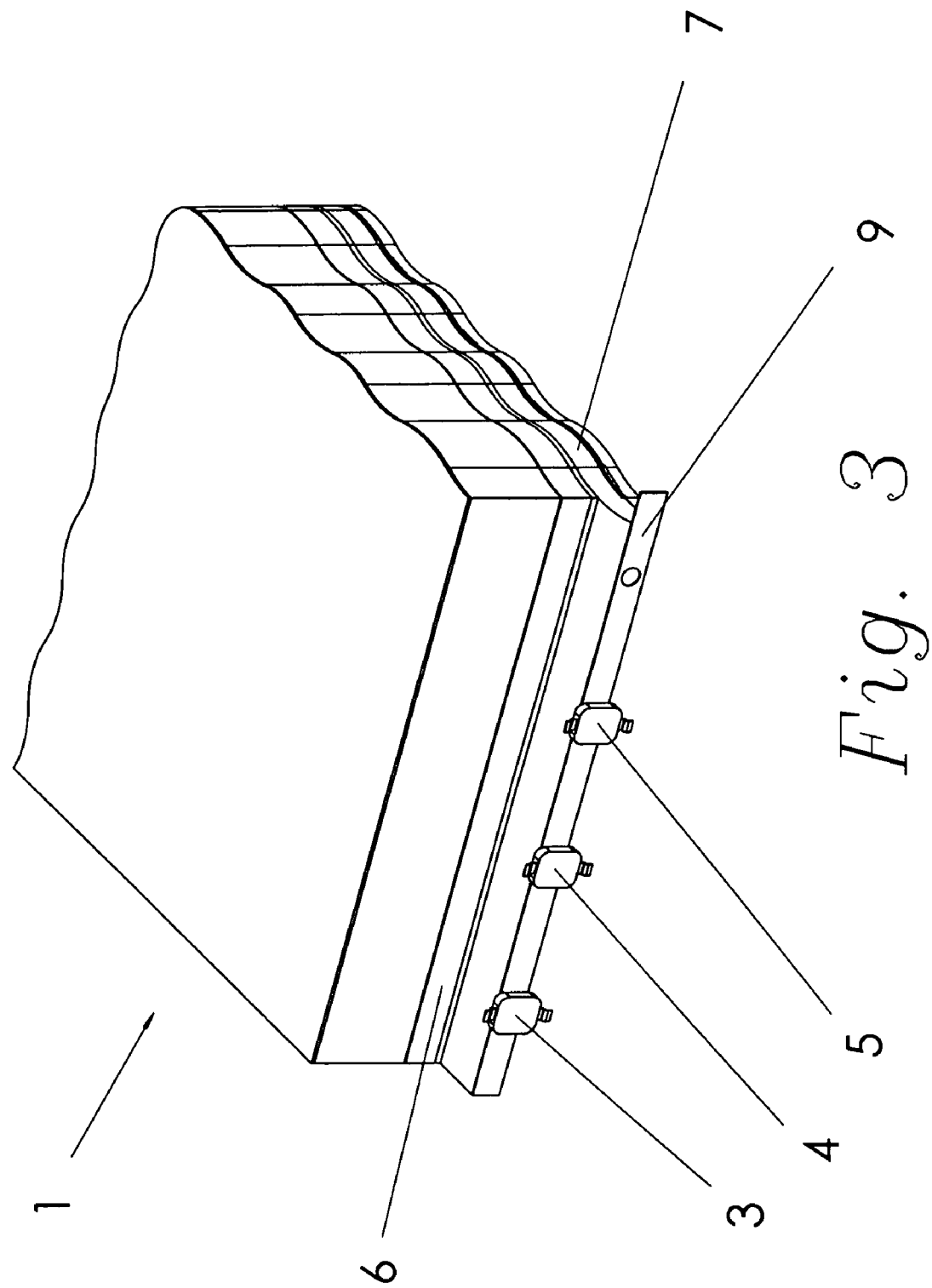
FIG. 3 is a magnified section of the lower left corner of the display shown in FIG. 1, with the display being rotated from a vertical orientation to horizontal.

In FIG. 3, the green, blue, and red LEDs 3, 4, 5 are shown in their true relationship to the light guide 7. End reflector 9 covers the same edge of the light guide 7 as do the LEDs 3, 4, 5. (End reflector 9 is shown in greater detail in FIG. 12, and its function will be discussed below.) The relative thicknesses of the major components 6, 7, 8, 10 can be seen in FIG. 12. The relative thicknesses of the major components 6, 7, 8, 10 would change for different sizes and pitches of a given display.

Figure 4:
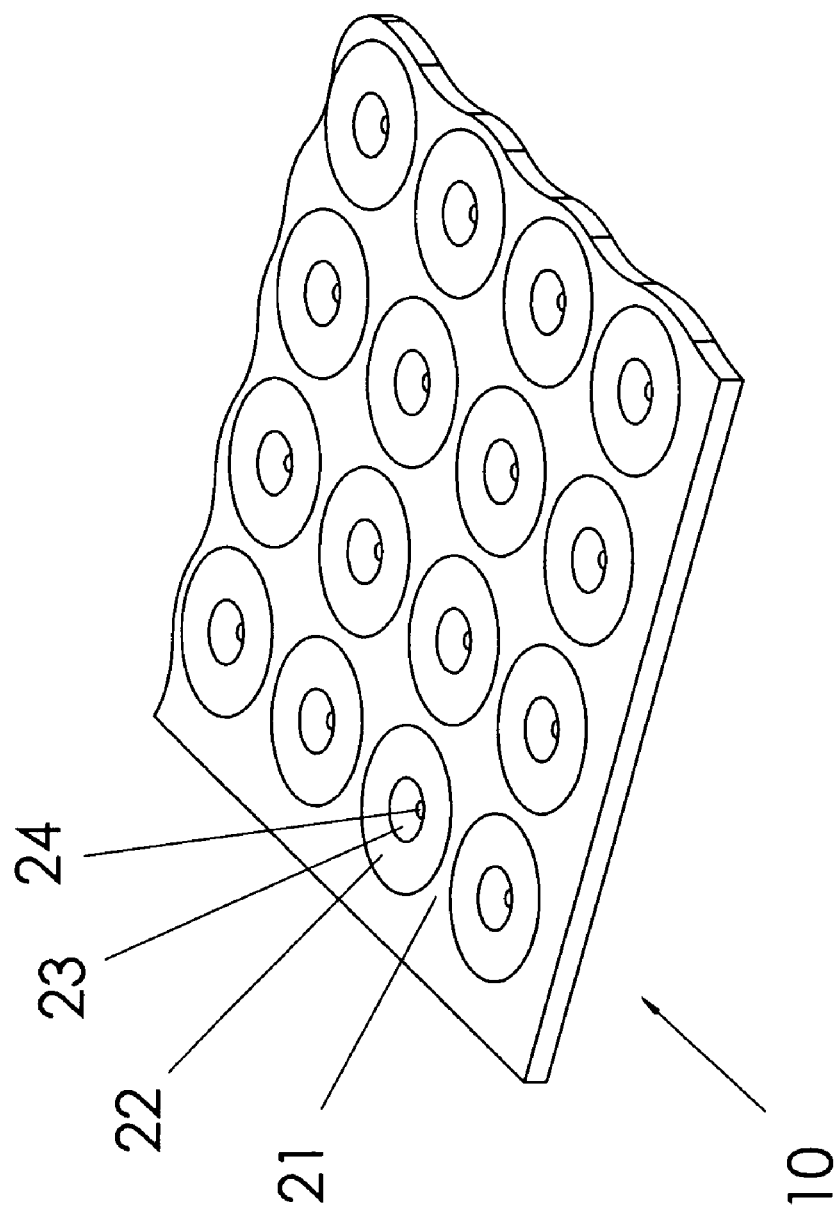
FIG. 4 is a top perspective view of the electronics back plane component of the TIR display.

Referring now to FIG. 4, the electronics back plane 10 is shown in the same orientation as it is in FIG. 3. The substrate material for the electronics back plane 10 should be an insulating material. For larger displays, a fiberglass reinforced PCB material or the like is desirable as the substrate. For smaller displays, the insulating substrate material may be glass, silicon, or plastic. The substrate material does not need to be optically transparent, so there are many options for material selection.

Electronic components may be located on the planar surface 21 of the electronics back plane 10. For clarity, no components are shown in FIG. 4. Annular rings 22 are located near the centerline of the pixel areas. The annular rings 22 are made of a conductive material, and are generally thin. The annular ring pocket 23 is a recessed area for clearance from optical components (discussed below). The annular ring pockets 23 are also made of conductive material and are thin. If any electronics were located on the backside of the electronics back plane 10 at least one feed through hole 24 would be required. The feed through holes 24 are shown to be concentric to the annular ring 22, but concentricity is not required. The feed through holes 24 could be located anywhere on the electronics back plane 10. The feed through holes 24 have a thin layer of conductive material that connects the annular rings 22 to any electronics present on the backside of the electronics back plane 10. It should be noted that any electronic components such as transistors, capacitors, or resistors that are required for the subject display application could be located either between the annular rings 22 or beneath the surface of the electronics back plane 10.

Figure 5:
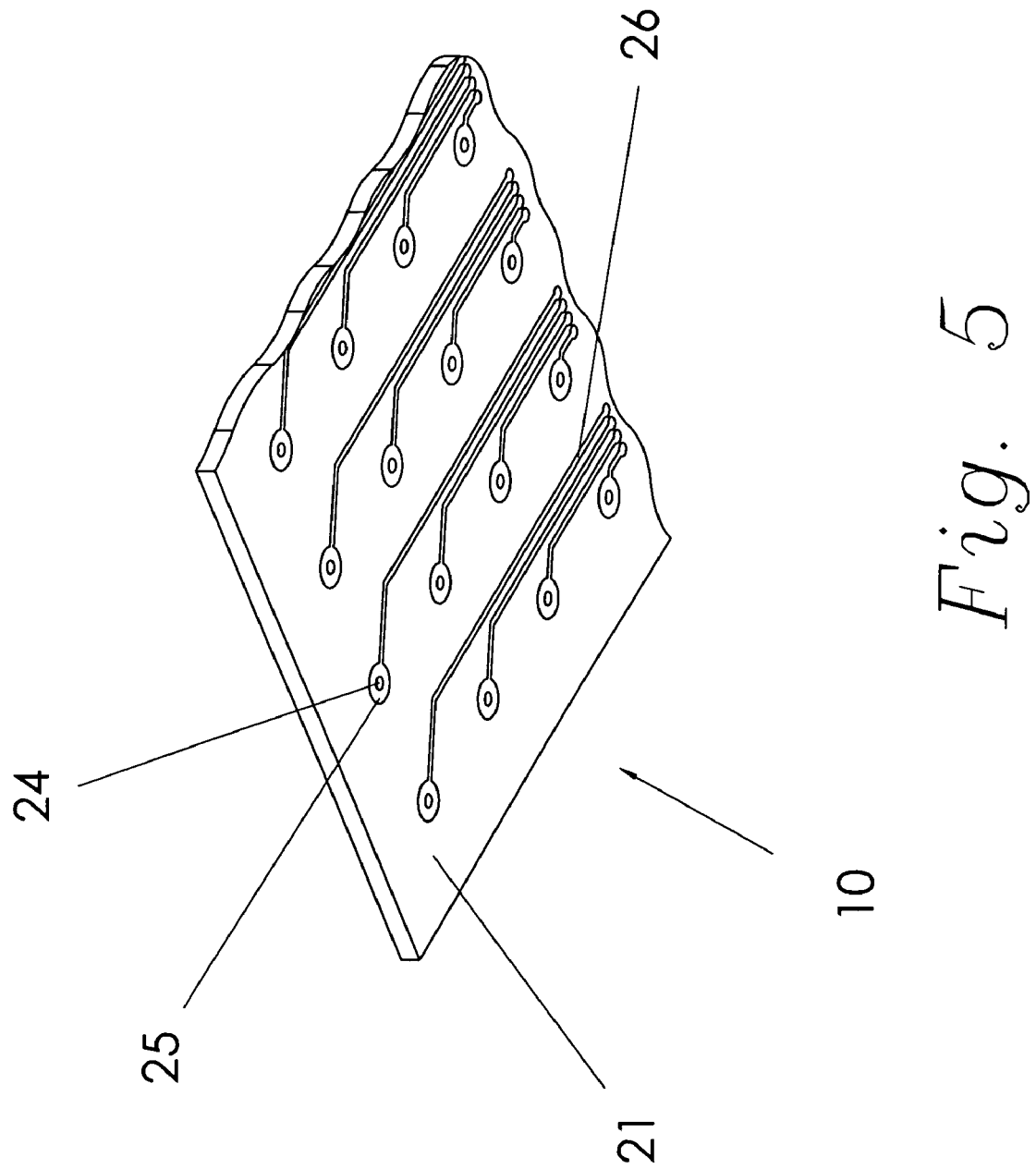
FIG. 5 is a bottom perspective view of the back plane component shown in FIG. 4.

Referring now to FIG. 5, the feed through holes 24 are visible on the back side of the electronics back plane 10. Bottom side annular rings 25 are formed from a thin layer of conductive material to provide electrical conductivity with the feed through holes 24. Conductive traces 26 are used to connect the bottom side annular rings 25 to circuitry located elsewhere on the backside of the board. Alternatively, the bottom side annular rings 25 can be connected to an electrical connector, which would put the bottom side annular rings 25 in communication with other electronic components on a remote PCB. One skilled in the art of electronic layout and manufacturing could easily define the appropriate location and type of electronics to reduce the overall system cost while improving performance.

Figure 6:
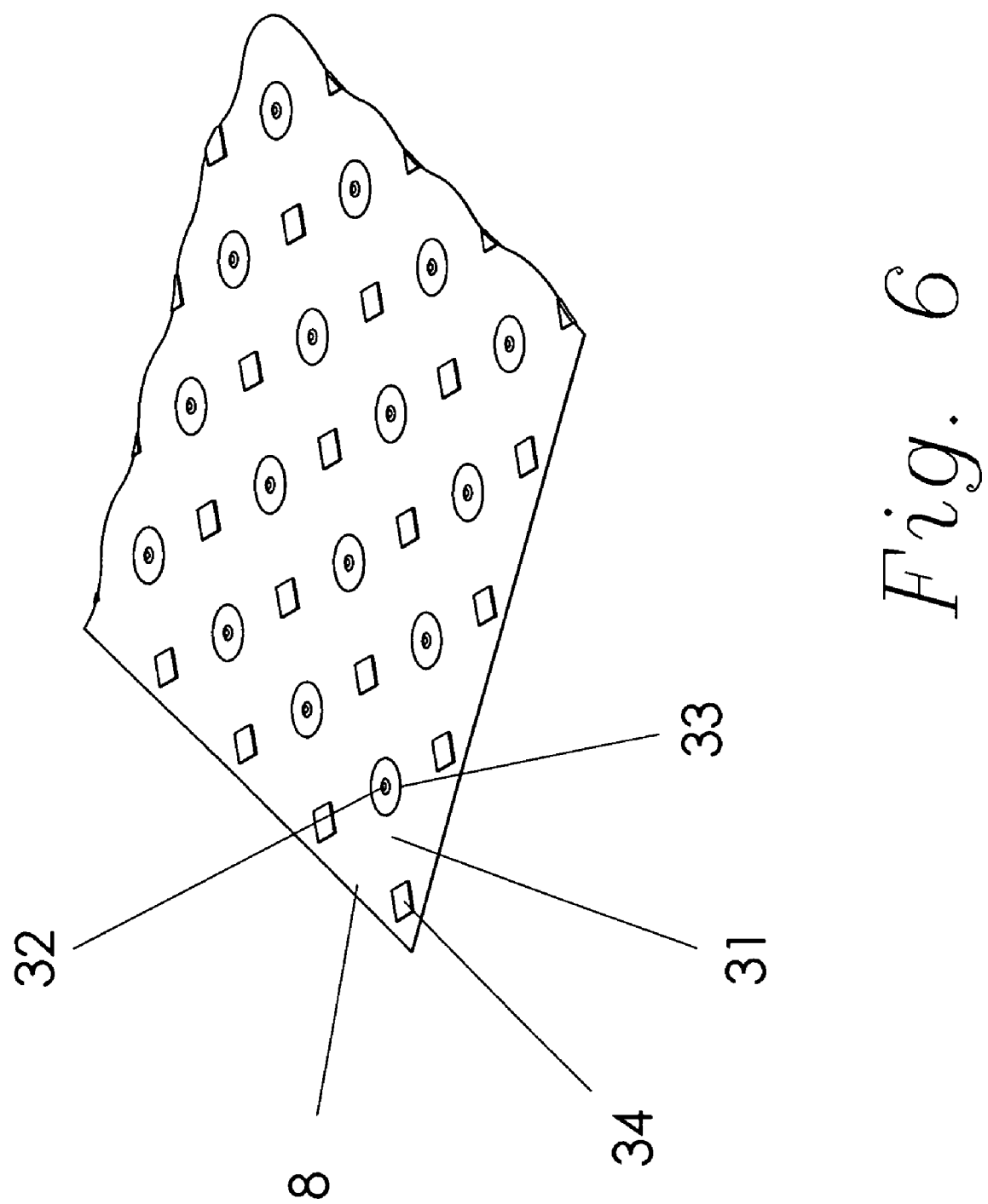
FIG. 6 is a detail view of the film component of the TIR display shown in FIG. 3.

The TIR switch film 8 is shown in FIG. 6. The TIR switch film 8 is made of a transparent flexible type material such as polycarbonate, polyester, acrylic, or the like. The top surface 31 of the TIR switch film 8 is situated in close proximity to the surface of the light guide 7 (not shown in FIG. 6), but there is a narrow gap between the top surface 31 of the TIR switch film 8 and the surface of the light guide 7. The contact domes 32 are ideally located in the center of the pixel area. (The contact domes 32 can be seen in more detail in FIG. 8.) The contact domes 32 preferably have a shallow taper and a flat region on a top surface. For very short contact domes 32, the domes 32 may not have any taper at all. (A contact dome without taper has the advantage of being able to be formed with a lithographic process. A dome with tapered sides would be best formed with a molding process.) Each of the contact domes 32 includes a reflector perimeter 33. The reflector perimeter 33 is positioned on the back side of the TIR switch film 8, but is visible in FIG. 6 because the TIR switch film 8 is transparent. The TIR switch film 8 is very thin to enable it to flex easily. The thickness of the TIR switch film 8 is less than 1/10 the diameter of the reflector perimeter 33.

Figure 7:
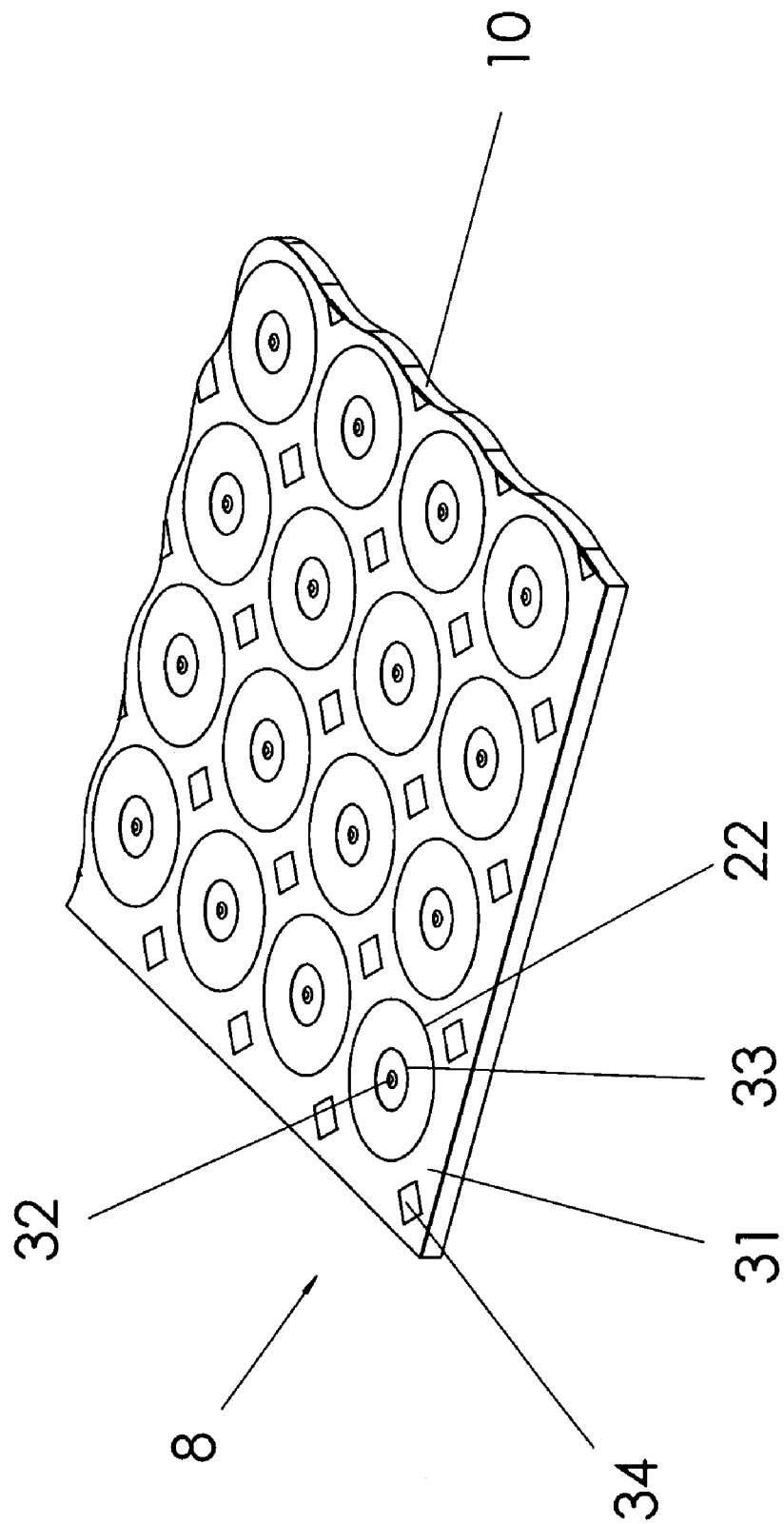
FIG. 7 shows the film component assembled with the electronics back plane component.
Figure 8:
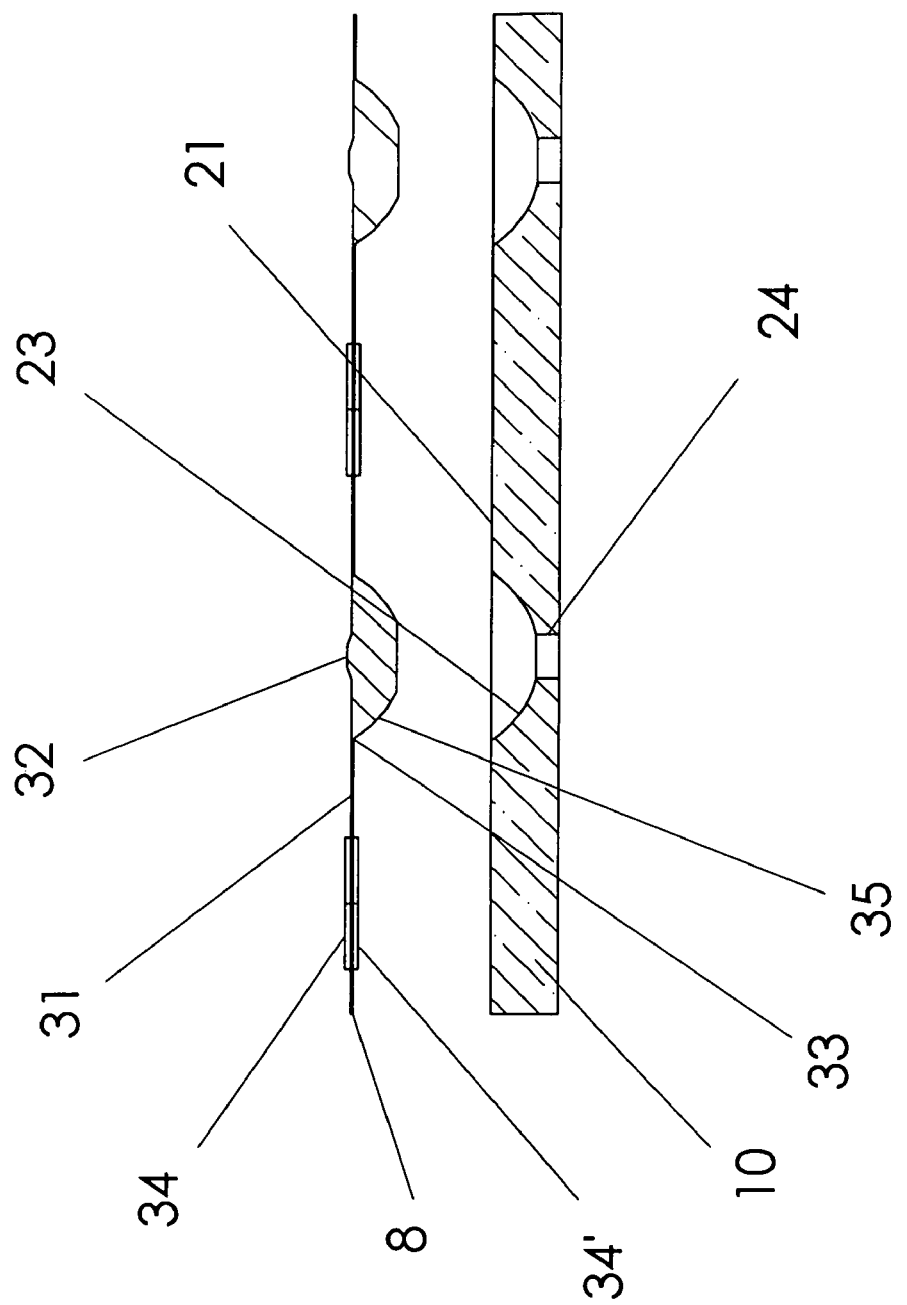
FIG. 8 is a magnified side view of the film component spaced away from the electronics back plane component.

Spacer posts 34 comprise another main element of the TIR switch film 8. The spacer posts 34 are located between the contact domes 32. The spacer posts 34 maintain the narrow gap 60 (visible in FIG. 15) between the TIR switch film 8 and the light guide 7. The spacer posts 34 are illustrated in FIGS. 6-8 as being square, but other shapes could be used as well. The spacer posts 34 extend downward through the TIR switch film 8 and out the bottom side to form the bottom spacer posts 34'. The bottom spacer posts 34' can most easily be seen in FIG. 8.

FIG. 7 shows the TIR switch film 8 assembled to the electronics back plane 10. The annular rings 22 on the electronics back plane 10 can be seen through the transparent TIR switch film 8. The centerline of the pixel features of the TIR switch film 8 and the electronics back plane 10 are generally in alignment.

FIG. 8 shows an exploded sectional side view of the electronics back plane 10 and the TIR switch film 8. The annular ring pockets 23 are shown in FIG. 8 as spherical in shape. The shape of the annular ring pockets 23 could be rectangular, trapezoidal or an irregular shape. The shape of the annular ring pockets 23 has no effect on the optical function of the invention. Reflectors 35 are received in the annular ring pockets 23. The shape of the reflector 35 is depicted as generally spherical, a reflector shape that would be acceptable for many applications. However, in most display applications the ideal shape for the reflectors 35 would be aspheric. The specific optimal aspheric shape of the reflectors 35 is a function of dome diameter, dome taper, dome position relative to the aspheric reflector, the index of refraction of the various components, and the diameter of the reflectors 35. Additionally, manufacturing methods for the reflectors 35 may have a practical effect on the shape chosen for the reflectors 35. One skilled in the art of the design of reflectors could devise a reflector shape to meet the specific design goals of a given overall display.

Figure 9:
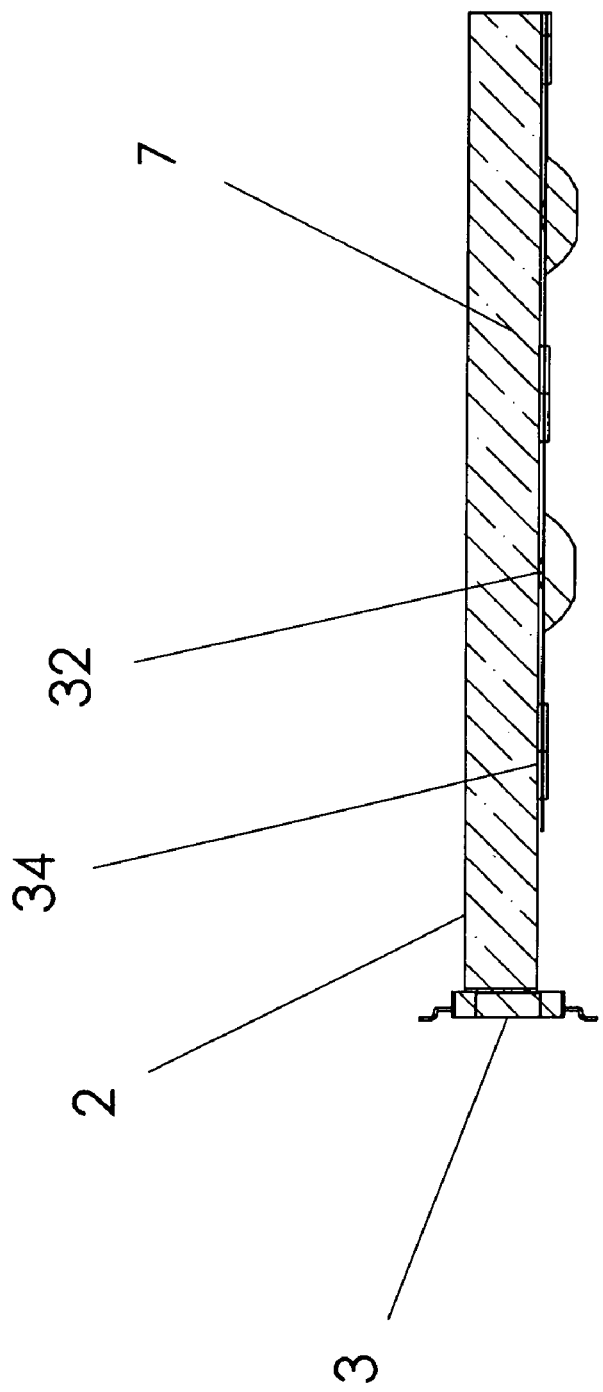
FIG. 9 is a side view of the flat panel display. Some of the components of the display are not shown for clarity.

The bottom spacer posts 34' are formed from the lower end of the spacer posts 34. The bottom surface of the bottom spacer posts 34' is in contact with and bonded to the planar surface 21 of the electronics back plane 10. The top surface of the spacer post 34 is bonded to the light guide 7. The adhesive for this bond should have a low index of refraction. If the adhesive has too high an index, the mating surface of the light guide 7 would need to be coated with a low index material. FIG. 9 shows the TIR switch film 8 bonded to the light guide 7. The contact domes 32 are in contact with the light guide 7. In those cases in which the light guide 7 is coated with a low index material, the areas where the contact domes 32 make contact with the light guide 7 must be void of the low index material.

Figure 10:
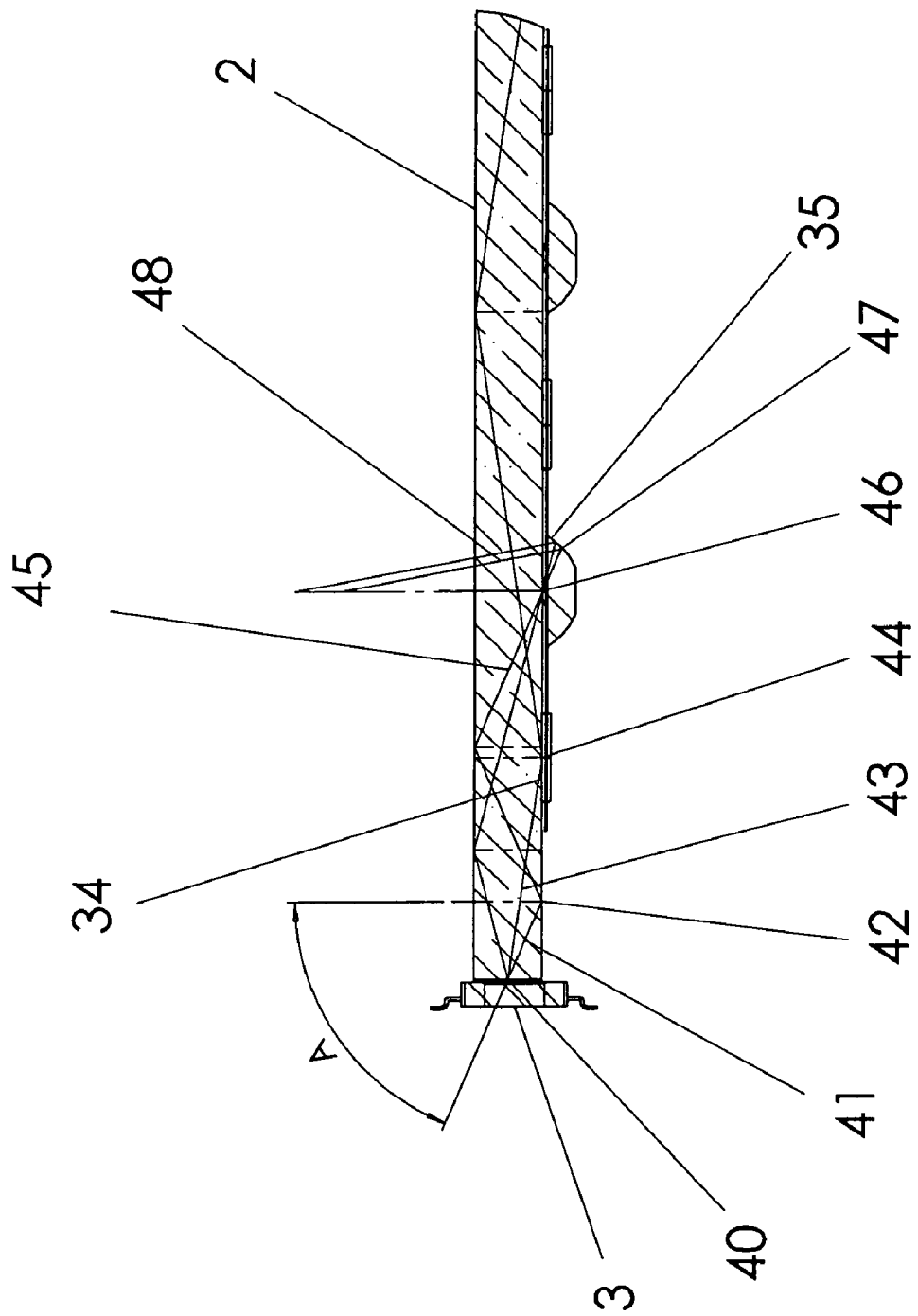
FIG. 10 is a side view of the display with several ray traces included.

Referring next to FIG. 10, light rays 41 originate from the green LED 3. The light rays 41 reflect off the film side surface 42 of the light guide 7. This reflection of the light rays 41 is total internal reflection, TIR. TIR occurs when the angle from normal to the film side surface 42 to the direction of the ray, angle "A", is less than the arcsine of the quotient of the index of refraction of the material adjacent to the surface of the light guide, "Ns", to the index of refraction of the material of the light guide, "Nlg". For the case where the light guide is made from acrylic and the adjacent material is air, angle A would be:

Angle $A = \arcsine(1/1.5) = 41.8°$ for $Ns=1$ and $Nlg=1.5$

If the internal angle A is less than 41.8°, light reflects off of the internal surface. If the angle A is greater than 41.8°, the light passes through the surface and is refracted to a different angle.

There are three cases where different materials are adjacent one another, and angle A is different for all three, they are:

Case 1 is when the light guide (index 1.5) is adjacent to air (index 1)

Case 2 is when the light guide (index 1.5) is adjacent a contact dome (index 1.5)

Case 3 is when the light guide (index 1.5) is adjacent a low index material (index 1.35)

Calculating the angle A for these three cases:

$A = \arcsine(Ns/Nlg)$

Case 1 For $Ns=1$, $Nlg=1.50$ $A=\arcsine(1/1.50)=41.8°$
Case 2 For $Ns=1.50$, $Nlg=1.50$ $A=\arcsine(1.50/1.50)=90°$
Case 3 For $Ns=1.35$, $Nlg=1.50$ $A=\arcsine(1.35/1.50)=64.2°$ From these three calculations it can be seen that light will continue to reflect down the light guide 7 when the approach angle of the light rays 41 is less than 62.5 degrees from normal to the surface of the light guide 7. Case 1 and case 3 are conditions where light would TIR. In case 2, the light does not TIR. The light passes through the surface of the light guide 7 and continues along its original path through the contact dome 32.

It should be noted that the light guide 7 and the contact dome 32 may not have the same index of refraction. If the indexes of refraction are not equal, some refraction will take place at the interface of the light guide 7 and the contact dome 32. The difference in the index of refraction between the materials determines the amount of the refraction. Preferably the index of refraction of the contact dome 32 is greater than that of the light guide 7. If the index of refraction of the contact dome 32 is less than that of the light guide 7, some of the light that is traveling at large angles normal to the surface of the light guide 7 would TIR and not pass through to the contact dome 32.

To correlate the three classes of angle A to FIG. 10: The reflection off the film side surface 42 using the air index of refraction is the first TIR reflection of light ray 41. This reflection would be bound by the equation of case 1. The low index TIR reflection 44 is a TIR reflection of the second light ray 43, and is bound by the equation of case 3. The third internal light ray 45 strikes the matched index point 46 and does not experience TIR. Third internal light rays 45 pass through the light guide 7 and contact dome 32 materials without a reflection, assuming that when third internal light rays 45 impinge on this point, the contact dome 32 is in contact with the light guide 7. It should be noted that the junction must be void of gaps. Even a small air gap would disrupt the passing of light. A small gap can be created by a small variation in surface finish or even by a small foreign particle. Addition of a thin layer of transparent elastic material on either the surface of the light guide 7 or the surface of the contact domes 32 ensures that the disruptions will not occur and the light will pass as desired.

The third internal light rays 45 continue beyond the contact dome 32 and reflect off of the surface of the reflector 35. The reflector 35 is preferably coated with a high reflectance material such as aluminum, silver, or a dielectric coating. The contour of the reflector 35 surface determines the direction of the reflected light 48. As discussed above, the contoured reflectors 35 are preferably aspheric in shape.

Figure 11:
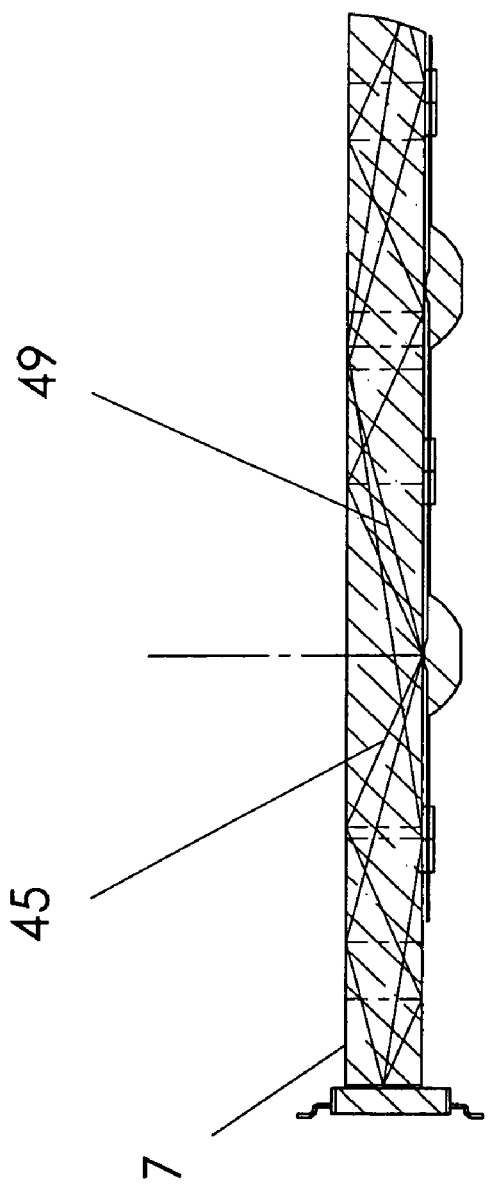
FIG. 11 is a side view of the display with several ray traces included and the TIR light valves turned off.

FIG. 11 shows the same elements as are shown in FIG. 10, but in FIG. 1 the contact dome 32 is not in contact with the light guide 7. When the contact dome 32 is not in contact with the surface of the light guide 7, the index of refraction at the surface of the light guide 7 is that of air. Under these conditions, case 1, light TIRs off the surface of the light guide 7. Light rays 49 continue to TIR along the inside of the light guide 7 until the rays 49 impinge on a contact dome 32 that is in contact with the light guide 7. In summary, when a contact dome 32 associated with a particular pixel is in contact with the surface of the light guide 7, that pixel is in an on state. When the contact dome 32 is not in contact with the light guide 7, the pixel is off.

Figure 12:
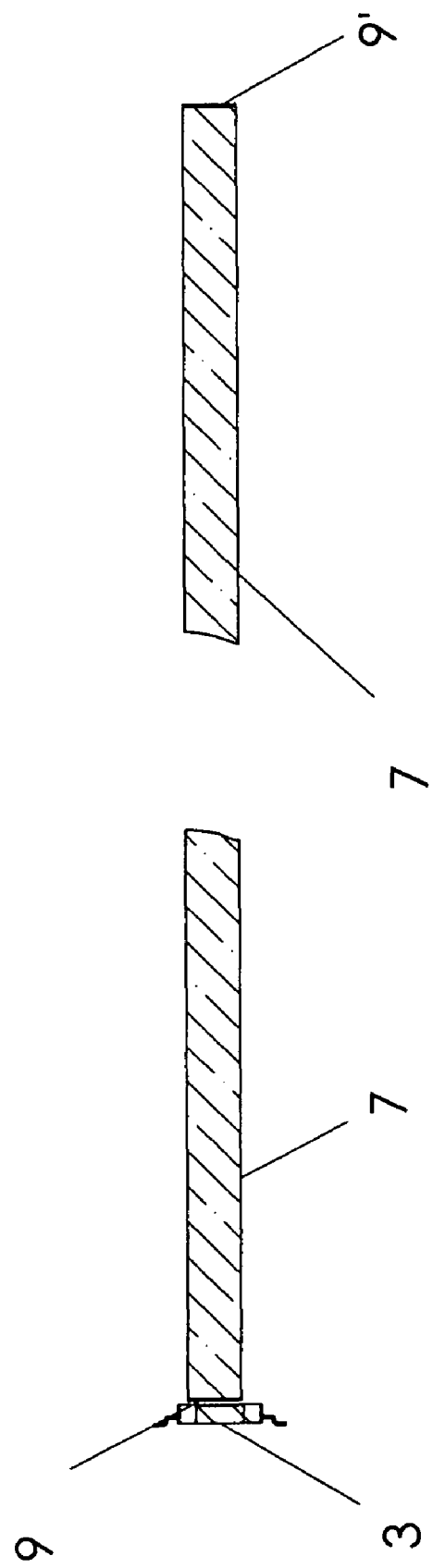
FIG. 12 is a compressed broken section view of the light guide, LED, and light guide reflectors.

FIG. 12 shows the light guide 7, LED 3, and the end reflectors 9 and 9' in side magnified view. End reflectors 9, 9' are preferably formed from a material that has a high reflectance. End reflectors 9, 9' can be interference type or metal reflectors, or the reflectors 9, 9' could be angled retro type reflectors.

Light will often travel the length of the light guide 7 from the LED 3 and not strike a contact dome 32 that is in the on position. The light will therefore TIR and will not be extracted from the light guide 7. In this case the light continues to travel along the full length of the light guide 7 until the light reaches the distal end of the light guide 7, and is reflected off end reflector 9'. This reflection redirects the light in the opposite direction back through the light guide 7. The light then travels back along the length of the light guide 7, and assuming it strikes no activated contact domes 32, will return to the first end of the light guide 7, the end on which the LEDs 3,4,5 are located.

At the first end, the light will either strike the area between the LEDs 3,4,5 or it will strike the LEDs 3,4,5. When the light strikes the area between the LEDs 3,4,5, it will be reflected by the end reflector 9. If the TIR switched thin flat panel display 1 has only a few LEDs 3,4,5, the light will almost always reflect off of the high reflectance end reflector 9. In some cases the light will reflect off of an LED 3,4,5. The LED 3,4,5 will absorb a portion of the light, and the remainder of the light will be reflected. Light may travel up and down the light guide 7 a number of times before it is extracted by a contact dome 32. This would be the case when only a few contact domes 32 are on and extracting light. If a lot of the contact domes 32 were on and in contact with the light guide 7, the likelihood of light making more than one or two passes along the light guide 7 is small. Even if there are a large number of reflections and the light makes multiple passes along the light guide 7, the loss of light is small. The end reflectors 9, 9' may have reflectance efficiencies of 98% or better, and good quality light guide material absorbs very little light.

Figure 13:
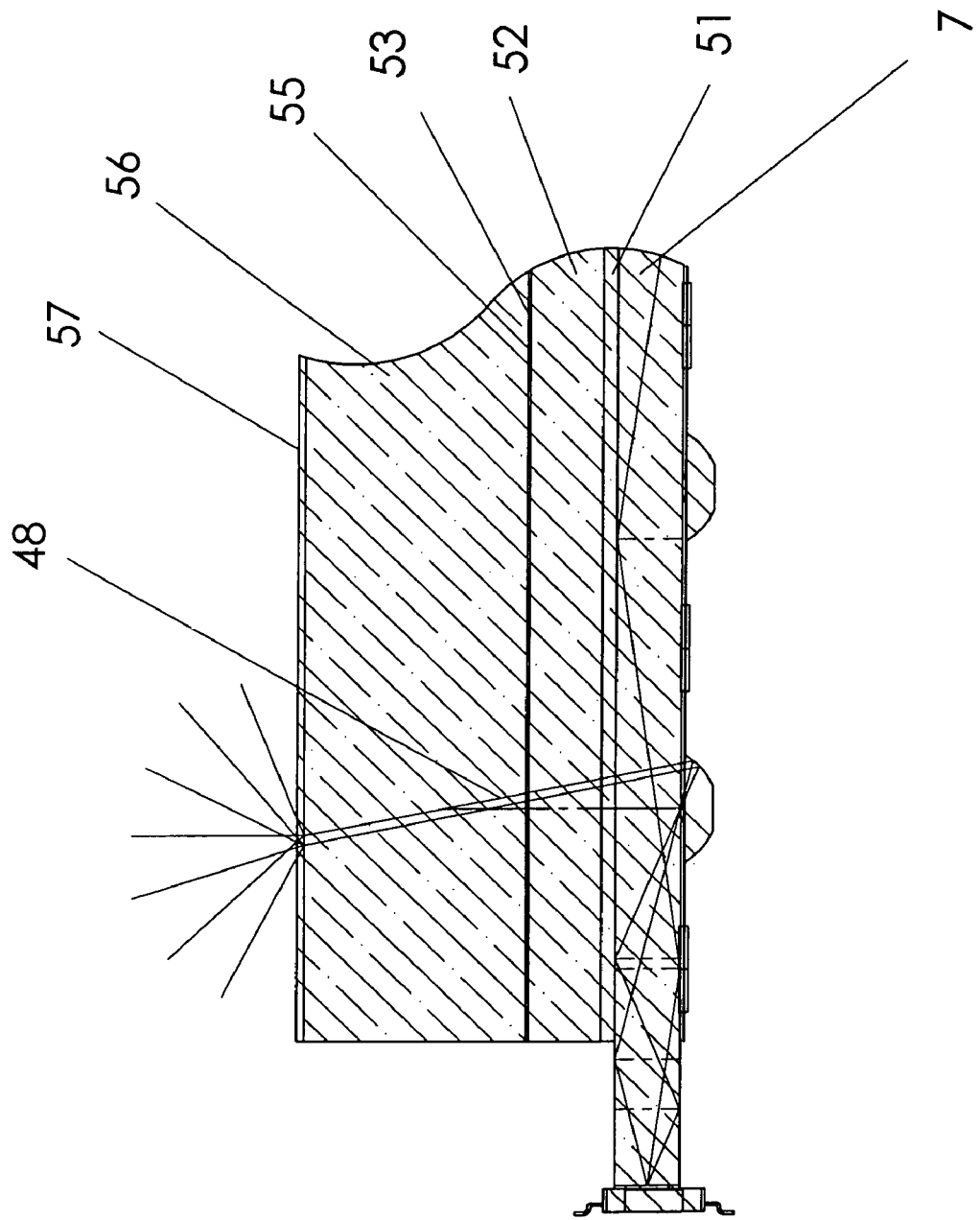
FIG. 13 is a side view of the flat panel display with all of the display components illustrated.
Figure 14:
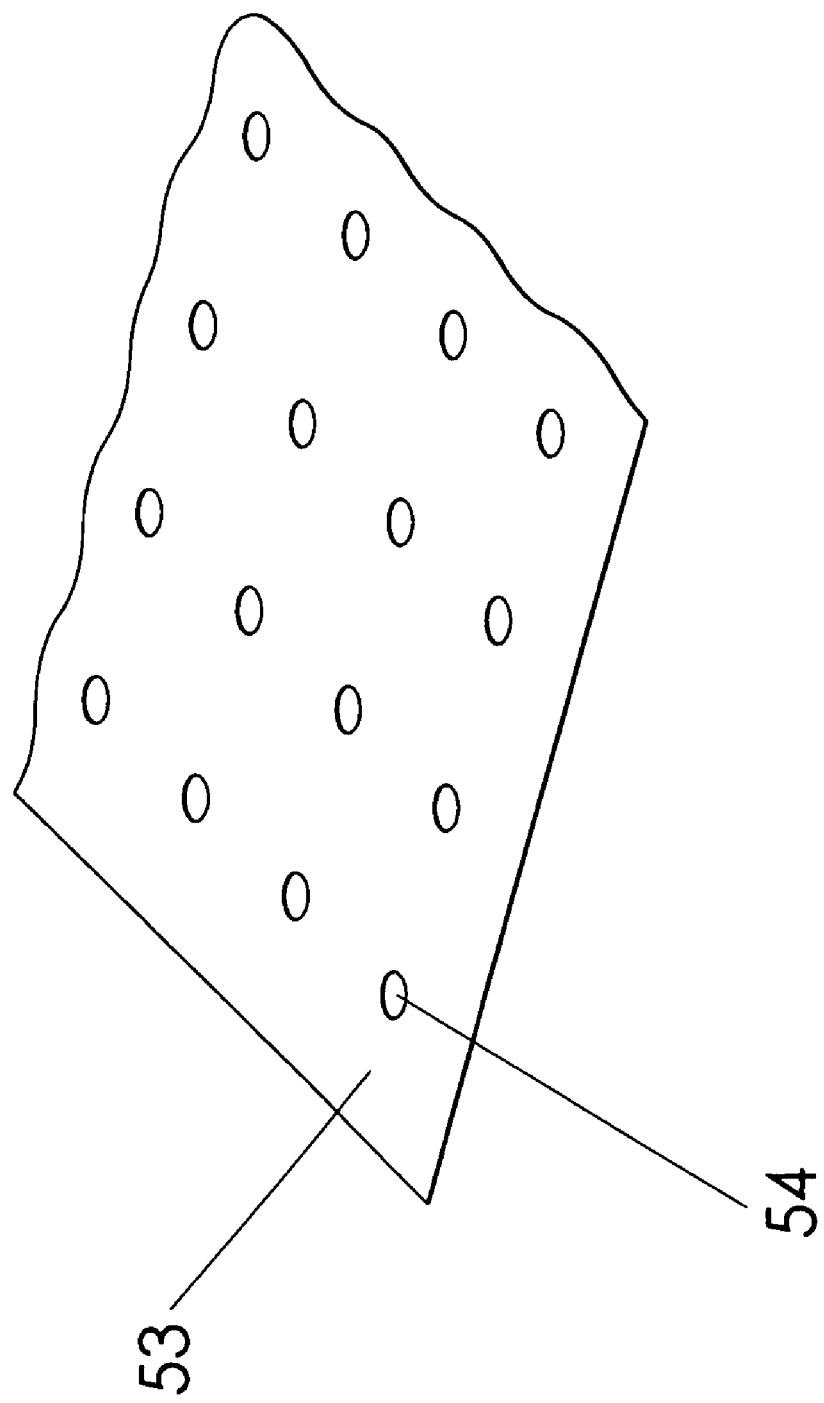
FIG. 14 is perspective view of a small section of the black mask.

Referring now to FIG. 13, a mask and diffusion assembly 6 is mounted above the panel area 2. The mask and diffusion assembly 6 is a multi-layered assembly, comprising a low index layer 51, a spacer plate 52, a mask plate 53, a first diffuser 55, a second spacer 56, and a second diffuser 57.

The low index layer 51 is thin and has a low index of refraction. An air gap or a vacuum layer could serve as the low index layer 51, but forming the low index layer 51 from a low refraction index solid material is often beneficial to the assembly of the device. The low index layer 51 will typically be an adhesive that affixes the spacer plate 52 to the light guide 7. In applications that require extremely thin displays, the low index layer 51 and the spacer plate 52 can be combined into one element, a thicker low index layer 51. However, for most larger displays, the use of two different materials to form the low index layer 51 and the spacer plate 52 is more beneficial.

Two thin layers, the mask plate 53 and the first diffuser 55, are positioned between the spacer plate 52 and the second spacer 56. The mask plate 53 contains multiple aperture holes 54 (see FIG. 15) to allow the reflected light 48 to pass through the mask plate 53. The remaining area of the mask plate 53 is preferably high absorbing black material. Black chrome, carbon black, or an organic material are three types of material that would serve as suitable materials for the mask plate 53. The mask plate 53 increases the contrast ratio of the display when ambient light is present. The mask plate 53 absorbs light that would otherwise reflect from the TIR switch film 8 or any of its components. For inexpensive displays, where cost is more important than quality, the mask plate 53 can be eliminated. Also, the mask plate 53 may be eliminated where the display is only used in low ambient lighting conditions. An example of a low ambient light environment would be a motion picture cinema.

The first diffuser 55 is an optional diffuser to spread the light coming from the reflectors 35. For small displays the first diffuser 55 may not be required, but for displays with large pixels, the first diffuser 55 should be included. It should also be noted that the positions of the mask plate 53 and the first diffuser 55 could be reversed without affecting the function of the display.

The second spacer 56 allows the light transmitted from the reflectors 35 to begin to spread out. The second diffuser 57 is used to spread the light still further so that the viewer can be at a position far from normal to the display and still see the light from the reflectors 35. The amount and direction of diffusion that is incorporated into the second diffuser 57 will vary for different types of displays. For example, small cell phone displays typically have a smaller viewing angle in both the vertical and horizontal directions. TVs typically have a large viewing angle in the horizontal direction and not as big a viewing angle in the vertical direction.

Figure 15:
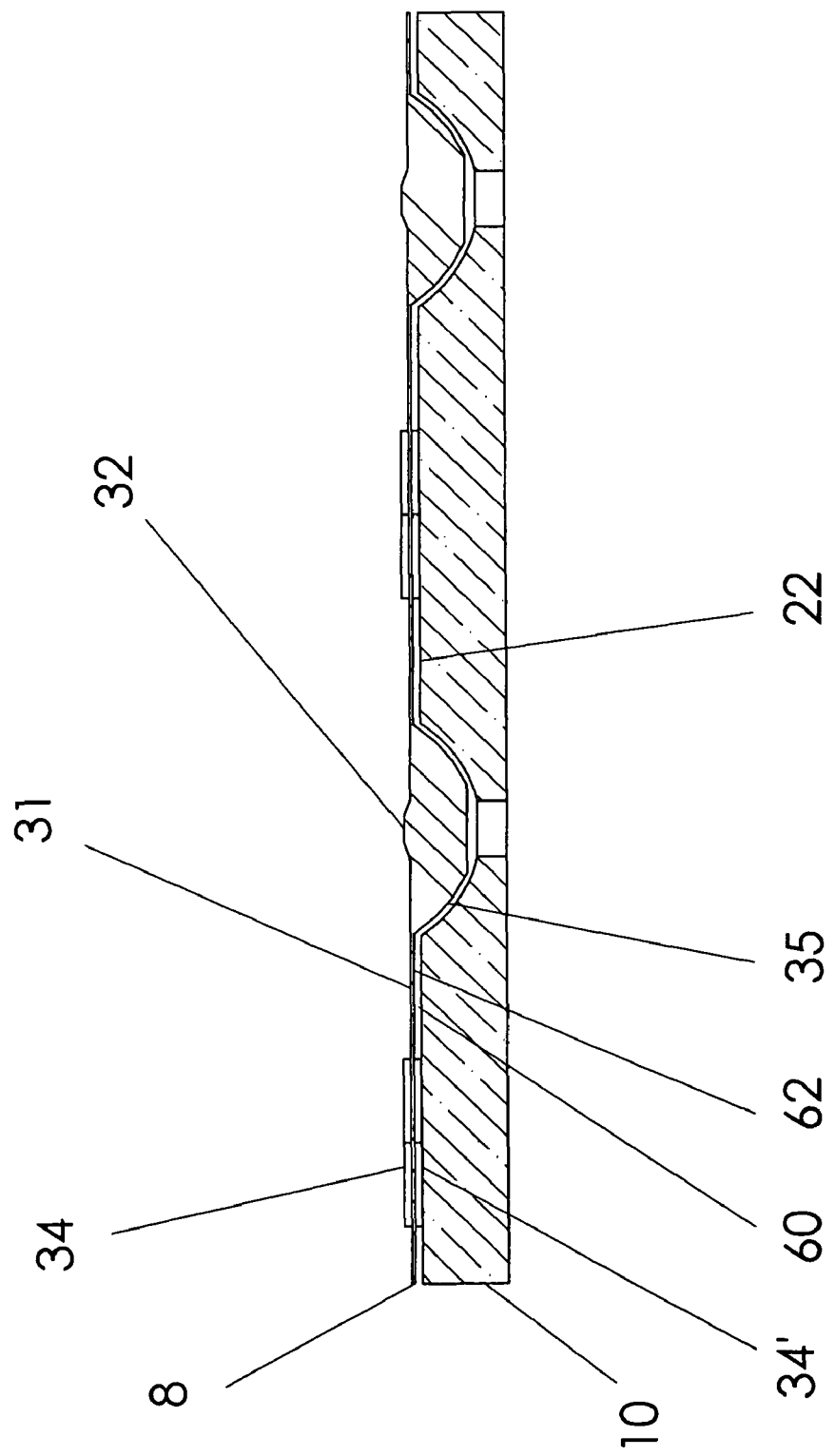
FIG. 15 is a magnified side view of the TIR switch film component and the electronics back plane assembled together.

Referring now to FIG. 15, the TIR switch film 8 is assembled to the electronics back plane 10. There is a narrow gap 60 between the switch film 8 and the electronics back plane 10 maintained by the spacer posts 34. The annular rings 22 of the electronics back plane 10 are in close proximity to the bottom surface of the TIR switch film 8. The bottom surface of the TIR switch film 8 is coated with a conductive layer 62. For ease of fabrication, the conductive layer 62 may be a continuation of the surface of the reflector 35. When the conductive layer 62 and the annular rings 22 are electrically charged, an electrostatic force is created. When the charges are of like polarity, the surfaces repel one another. When the charges are of opposite polarity, the surfaces are drawn to one another. Therefore, by controlling the relative charge of these surfaces, the conductive layer 62 and the annular rings 22, the contact domes 32 can be driven against or removed from contact with the surface of the light guide 7 (not shown in FIG. 15). To keep the two charged surfaces from shorting, either one or both of the charged surfaces is coated with an insulating layer.

It should be noted that electrostatic force is not the only means that can be used to control the contact of the contact domes 32 with the surface of the light guide 7. One alternate method would be the use of a piezoelectric material. Another would be to use magnetism. Those skilled in the art of actuation devices could devise many ways to change the positions of the contact domes 32. Further, there are a limitless number of electronic circuits that could be devised to drive the actuator.

Figure 16:
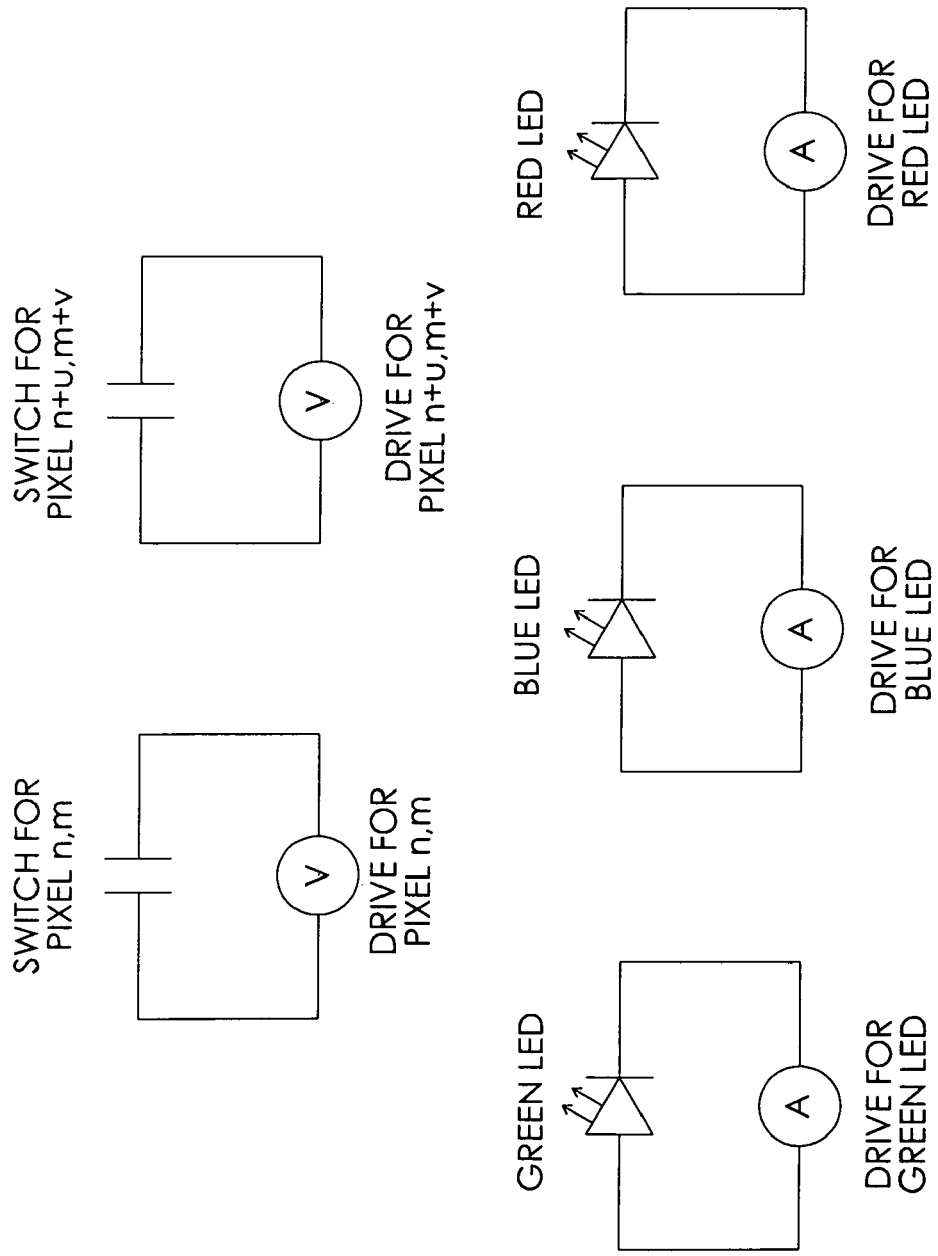
FIG. 16 is a schematic diagram of the control electronics required for color sequencing.

FIG. 16 depicts schematic representations of the circuitry used to create colors at the pixels. To create a green image for the viewer at pixel n,m, the switch for pixel n,m is moved to a state that has the contact dome 32 in contact with the light guide 7, and the driver for the green LED 3 is turned on. The blue and red LEDs 4, 5 would not be on. (One exception to this case is if the display was only creating a black and white image. Then all three LEDs 3,4,5 would be on at the same time. Or a white LED could be used.) The contact dome 32 associated with pixel n,m remains in contact with the light guide 7 for the appropriate period of time to allow the desired amount of light to exit the pixel to create to create the desired intensity for the viewer. To create a blue display, the contact dome 32 is placed in contact with the light guide 7 when the blue LED 4 is on. The contact dome 32 remains in contact the amount of time required to create the particular intensity needed for the viewer. Red colors are created in a similar manner. To create secondary colors or white, the contact dome 32 is placed in contact with the light guide for two or more periods when two or three of the LEDs 3,4,5 are on.

For example, to create a yellow image at a pixel, the contact dome 32 would extract light from the light guide 7 when the red LED 5 is on. After the red LED 5 goes off, the blue LED 4 is turned on. The contact dome 32 does not extract light during the time the blue LED 4 is on. The green LED 3 would be turned on after the blue LED 4 is turned off. When the green LED 3 is on, the contact dome 32 would again allow light to reach the viewer. This would happen hundreds of times per second resulting in the human eye integrating the red and green into yellow. The length of time that the contact dome 32 allows light to reach the viewer determines the brightness. By altering the individual time periods for the red and green the hue of the yellow can be controlled. Some blue light can be added to reduce the saturation of the yellow.

It should be noted that LEDs do not typically emit a wide range of wavelengths of light. A high quality display may include LEDs with wavelengths between the primary RGB LEDs. Examples are orange, cyan and yellow. By adding these extra wavelengths the spectrum output of the TIR display could be made to match what a viewer would see in the real world. Very little additional circuitry is required to add this improved performance.

It should also be noted that electronics are required to control the switches and the LEDs of the present invention. Electronics are also required to relate the operation of the optics elements to a computer, TV, or other type of video signal. Control electronics of this type are created for display systems that create colors by multiplexing the colors in time. One skilled in the art would be able to devise many ways to accomplish this task. The innovative part of this invention is the optical switching and optics, not the configuration of the electronic components.

Figure 17:
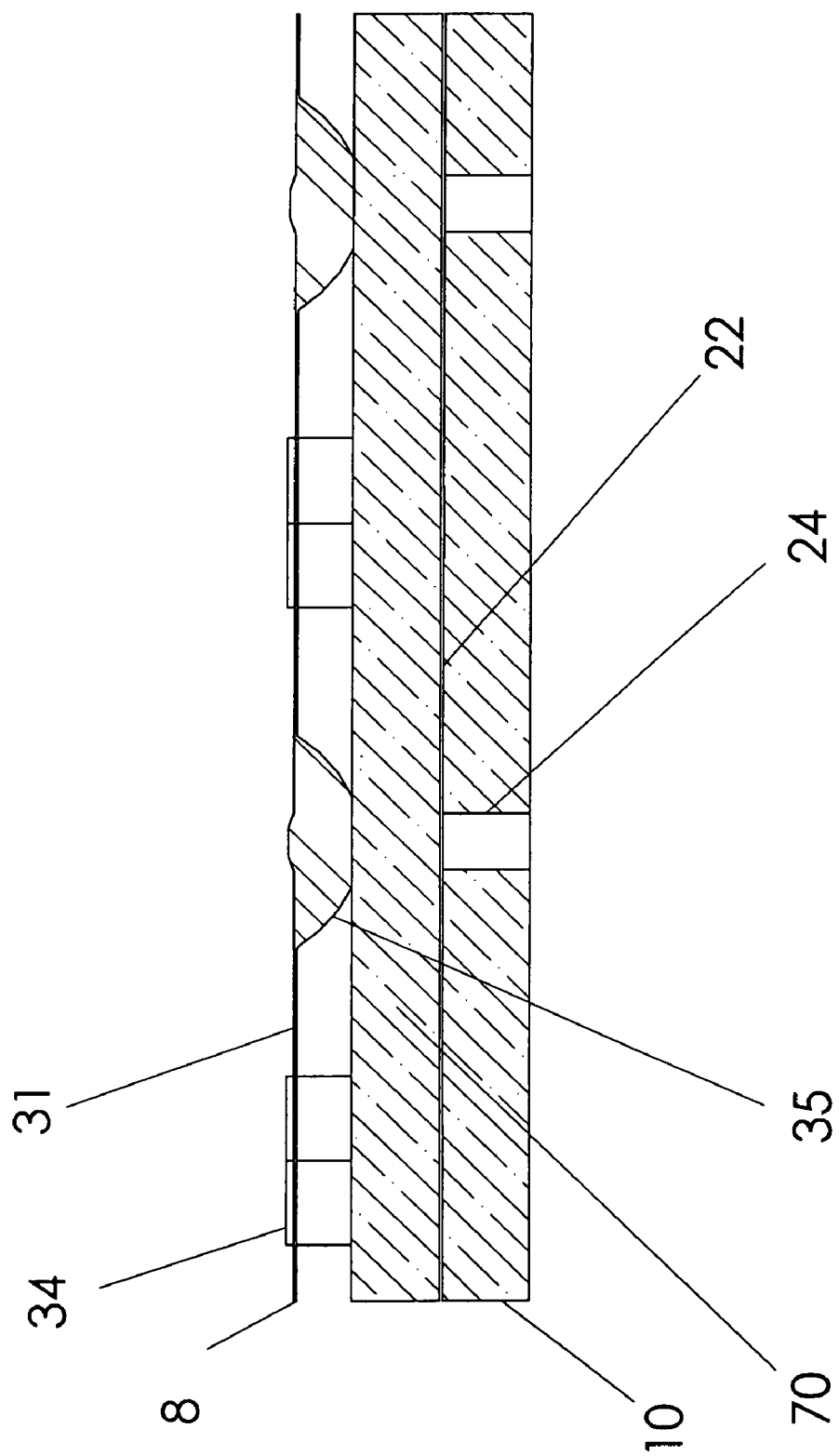
FIG. 17 illustrates the flat panel display utilizing a piezo or electroelastomer element.

FIG. 17 illustrates the device using a piezoelectric material 70 as the actuating mechanism. This embodiment shows the piezoelectric material 70 attached to the reflector surface 35. The piezoelectric material 70 is driven with the same type electronics back plane 10 as is used to drive the electrostatic force switching mechanism. By changing the height of the piezoelectric material 70, the surface of the reflector 35, and therefore the contact dome 32, can be turned on and off.

Figure 18:
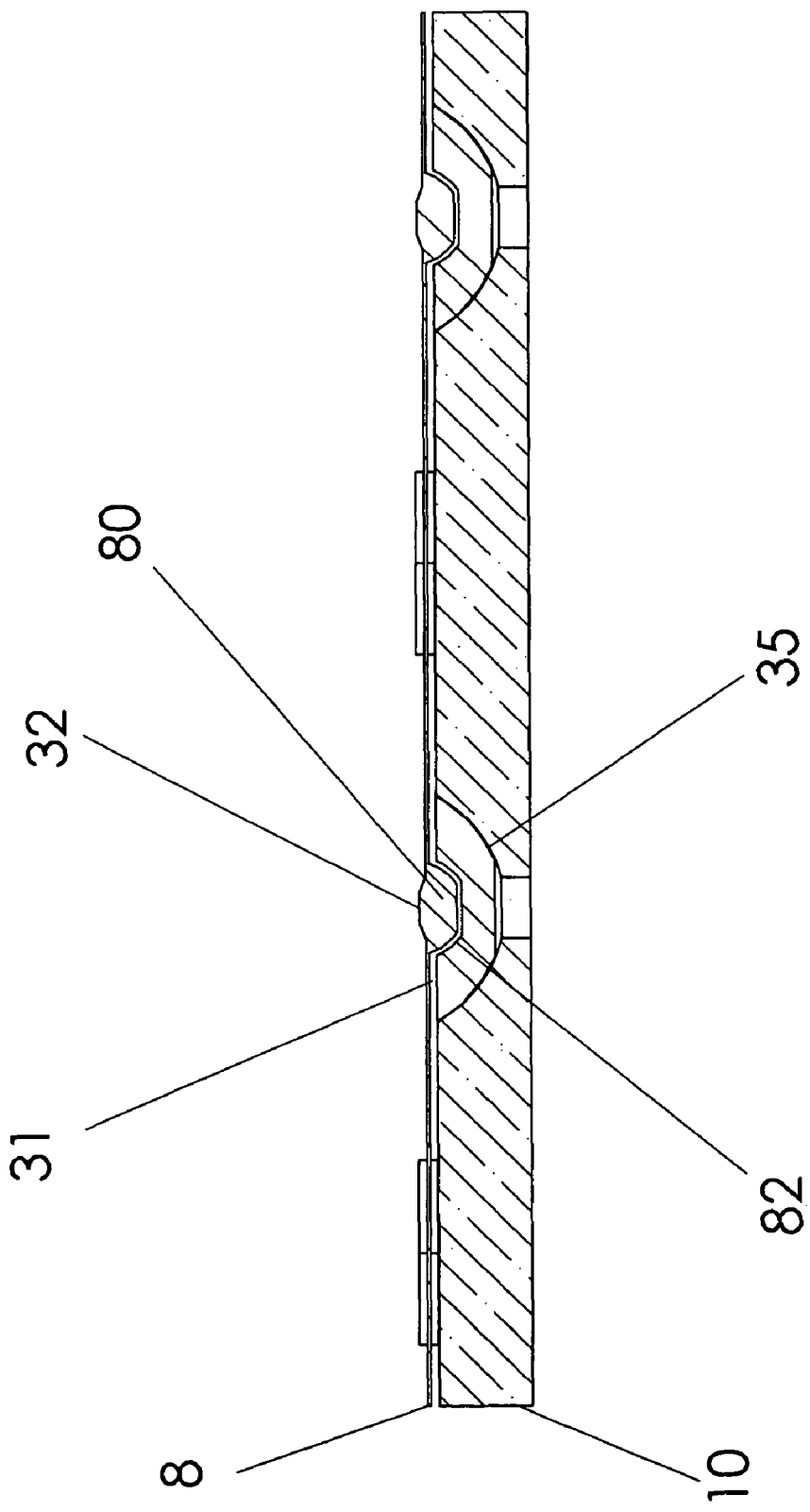
FIG. 18 shows the flat panel display with a fixed reflector.

Another configuration of the device is shown in FIG. 18, which shows the contact domes 32 mounted on angled cones 80 on the TIR switch film 8. This configuration is preferred when the reflector size is large. The reflector 35 would be stationary and would have an angled cone relieved area 82 slightly larger than the angled cone 80 mounted on the TIR switch film 8. The angled cone relieved area 82 allows clearance for the contact dome 32 and the angled cone 80 to move into contact with, and away from, the light guide 7.

Figure 19:
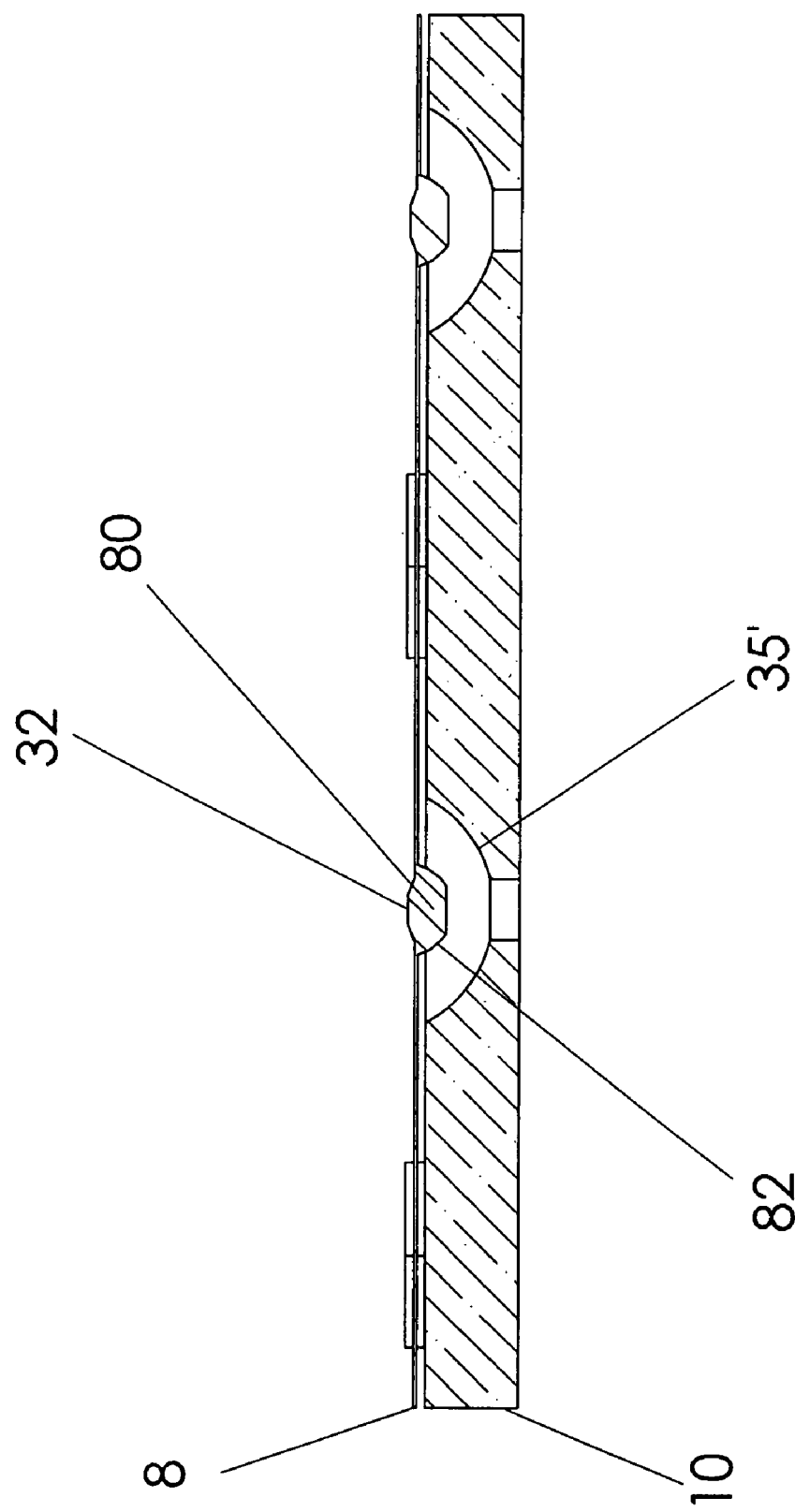
FIG. 19 shows the flat panel display with a hollow fixed reflector.

FIG. 19 illustrates a configuration of the device in which the reflector area 35' is void of material and would be air or a vacuum. The reflector area 35' would still be employed to reflect light.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

The invention claimed is:

1. A display device comprising:
a light source,
a light guide, and
a plurality of optical elements that allow selective extraction of light from said light guide; wherein
light projected from said light source travels through said light guide by total internal reflection,
when light traveling through said light guide contacts one of said optical elements that is in an on position, light is extracted from said light guide via said optical element, the light being directed through said display device to a viewer, and
when light traveling through said light guide contacts one of said optical elements in an off position, the light continues to travel through said light guide by total internal reflection.

2. The display device of claim 1 wherein:
said optical elements are placed in said on position by physical contact of the optical element with said light guide, and
said optical elements are placed in said off position by maintaining a low index of refraction near a surface of said light guide, said surface of said light guide thereby maintaining total internal reflection.

3. The display device of claim 1 wherein:
said optical elements are placed in said on position by physical contact of said optical element with said light guide, a contact point of said at least one of said optical elements with said light guide creating a discontinuity of material that negates total internal reflection in said light guide.

4. The display device of claim 3 wherein:
said optical elements are moved between said on position and said off position by an electrostatic force.

5. The display device of claim 2 wherein:
physical contact of said optical elements with said light guide occurs on a side opposite an output side of said light guide.

6. The display device of claim 3 wherein:
physical contact of said optical elements with said light guide occurs on a side opposite an output side of said light guide.

7. The display device of claim 1 wherein:
said selective extraction of light occurs at an interface of said light guide and a controlling electronics panel.

8. The display device of claim 2 wherein:
said selective extraction of light occurs at an interface of said light guide and a controlling electronics panel.

9. The display device of claim 3 wherein:
said selective extraction of light occurs at an interface of said light guide and a controlling electronics panel.

10. The display device of claim 1 wherein:
said light source generates red, green, and blue light.

11. The display device of claim 2 wherein:
said light source generates red, green, and blue light.

12. The display device of claim 3 wherein:
said light source generates red, green, and blue light.

13. The display device of claim 1 wherein:
said light source generates red, green, blue, yellow, and cyan light.

14. The display device of claim 2 wherein:
said light source generates red, green, blue, yellow, and cyan light.

15. The display device of claim 3 wherein:
said light source generates red, green, blue, yellow, and cyan light.

16. The display device of claim 1 wherein:
said light source generates white light.

17. The display device of claim 2 wherein:
said light source generates white light.

18. The display device of claim 3 wherein:
said light source generates white light.

19. The display device of claim 1 wherein:
a mask plate made from light absorbing material is positioned between said light guide and an output of said display device, said mask plate comprising a plurality of apertures that allow light to pass through said mask plate, said mask plate thereby increasing a contrast ratio of said output of said display device.

20. The display device of claim 2 wherein:
a mask plate made from light absorbing material is positioned between said light guide and an output of said display device, said mask plate comprising a plurality of apertures that allow light to pass through said mask plate, said mask plate thereby increasing a contrast ratio of said output of said display device.

21. The display device of claim 3 wherein:
a mask plate made from light absorbing material is positioned between said light guide and an output of said display device, said mask plate comprising a plurality of apertures that allow light to pass through said mask plate, said mask plate thereby increasing a contrast ratio of said output of said display device.

22. The display device of claim 1 wherein:
at least one diffusing layer is positioned between said light guide and an output of said display device, said diffusing layer spreading said output of said display device to improve visibility of said output from angles displaced from normal to said output.

23. The display device of claim 2 wherein:
at least one diffusing layer is positioned between said light guide and an output of said display device, said diffusing layer spreading said output of said display device to improve visibility of said output from angles displaced from normal to said output.

24. The display device of claim 3 wherein:
at least one diffusing layer is positioned between said light guide and an output of said display device, said diffusing layer spreading said output of said display device to improve visibility of said output from angles displaced from normal to said output.

* * * * *